United States Patent
Kikuchi et al.

(10) Patent No.: US 8,148,938 B2
(45) Date of Patent: Apr. 3, 2012

(54) LEAD STORAGE BATTERY CHARGING CONTROL METHOD, CHARGING CONTROL CIRCUIT, POWER SOURCE DEVICE, AND LEAD STORAGE BATTERY

(75) Inventors: Tomoya Kikuchi, Aichi (JP); Harumi Murochi, Aichi (JP); Yasuyuki Yoshihara, Aichi (JP); Kazuyuki Shimada, Aichi (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/148,221

(22) PCT Filed: May 27, 2010

(86) PCT No.: PCT/JP2010/003576
§ 371 (c)(1),
(2), (4) Date: Aug. 5, 2011

(87) PCT Pub. No.: WO2010/137334
PCT Pub. Date: Dec. 2, 2010

(65) Prior Publication Data
US 2011/0285357 A1   Nov. 24, 2011

(30) Foreign Application Priority Data

May 28, 2009   (JP) .................................. 2009-128465

(51) Int. Cl.
*H01M 10/46* (2006.01)
(52) U.S. Cl. ........................................................ 320/107
(58) Field of Classification Search .................. 320/107, 320/112, 132; 429/99, 100, 9, 321, 209, 429/212, 225, 228
See application file for complete search history.

(56) References Cited

U.S. PATENT DOCUMENTS

| 4,548,835 | A  | * | 10/1985 | Takahashi et al. | ............ | 427/123 |
| 2008/0107960 | A1 | * | 5/2008 | Furukawa et al. | ............ | 429/163 |
| 2008/0241686 | A1 | * | 10/2008 | Sugie et al. | .................... | 429/211 |
| 2011/0083966 | A1 | * | 4/2011 | Kirchev | ........................ | 205/161 |

FOREIGN PATENT DOCUMENTS

| JP | 01-093058 A | 4/1989 |
| JP | 07-111162 A | 4/1995 |
| JP | 09-129261 A | 5/1997 |
| JP | 11-089104 A | 3/1999 |
| JP | 2002-354696 A | 12/2002 |
| JP | 2003-052129 A | 2/2003 |
| JP | 2003-111291 A | 4/2003 |
| JP | 2003-346890 A | 12/2003 |

(Continued)

*Primary Examiner* — Edward Tso
(74) *Attorney, Agent, or Firm* — McDermott Will & Emery LLP

(57) ABSTRACT

Disclosed is a charging control method including: a full charging step of charging a lead storage battery until the battery is fully charged; a refresh charging step of performing refresh charging of charging the lead storage battery with a predetermined refresh charging quantity of electricity after the lead storage battery has been fully charged; and a refresh charging quantity setting step of setting the refresh charging quantity of electricity in the refresh charging step for the lead storage battery which has been fully charged at a present time, depending on a temperature of the lead storage battery throughout a deficient charging period, the deficient charging period being a period from a time when the lead storage battery has been fully charged at a previous time to a time when the lead storage battery has been fully charged at the present time in the full charging step.

2 Claims, 11 Drawing Sheets

| REFRESH CHARGING QUANTITY OF ELECTRICITY Qr (Ah) | | BATTERY TEMPERATURE DURING DEFICIENT CHARGING PERIOD | | | | | |
|---|---|---|---|---|---|---|---|
| | | 0°C~5°C | 6°C~10°C | 11°C~20°C | 21°C~30°C | 31°C~40°C | 41°C~ |
| DEFICIENT CHARGING PERIOD $t_A$ | FOR 0 TO 7 DAYS | 0 | 0 | 0 | 0 | 0 | 0 |
| | FOR 8 TO 14 DAYS | 4.5 | 4.3 | 4.0 | 3.8 | 3.5 | 3.0 |
| | FOR 15 TO 21 DAYS | 9.0 | 8.5 | 8.0 | 7.5 | 7.0 | 6.0 |
| | FOR 22 TO 28 DAYS | 10.5 | 10.0 | 9.5 | 9.0 | 8.5 | 7.5 |
| | FOR 29 TO 42 DAYS | 12.0 | 11.5 | 11.0 | 10.5 | 10.0 | 9.0 |
| | FOR 43 TO 56 DAYS | 13.5 | 13.0 | 12.5 | 12.0 | 11.5 | 10.5 |
| | FOR 57 TO 84 DAYS | 15.0 | 14.5 | 14.0 | 13.5 | 13.0 | 12.0 |
| | FOR 85 DAYS AND MORE | 18.0 | 17.5 | 17.0 | 16.5 | 16.0 | 15.0 |

FOREIGN PATENT DOCUMENTS

| | | |
|---|---|---|
| JP | 2003-346911 A | 12/2003 |
| JP | 2006-156022 A | 6/2006 |
| JP | 2006-164540 A | 6/2006 |
| JP | 2007-305368 A | 11/2007 |
| JP | 2008-071717 A | 3/2008 |

\* cited by examiner

FIG. 5

| REFRESH CHARGING QUANTITY OF ELECTRICITY Qr (Ah) | BATTERY TEMPERATURE DURING DEFICIENT CHARGING PERIOD | | | | | | | |
|---|---|---|---|---|---|---|---|---|
| DEFICIENT CHARGING PERIOD $t_A$ | 0°C~5°C | 6°C~10°C | 11°C~20°C | 21°C~30°C | 31°C~40°C | 41°C~ |
| FOR 0 TO 7 DAYS | 0 | 0 | 0 | 0 | 0 | 0 |
| FOR 8 TO 14 DAYS | 4.5 | 4.3 | 4.0 | 3.8 | 3.5 | 3.0 |
| FOR 15 TO 21 DAYS | 9.0 | 8.5 | 8.0 | 7.5 | 7.0 | 6.0 |
| FOR 22 TO 28 DAYS | 10.5 | 10.0 | 9.5 | 9.0 | 8.5 | 7.5 |
| FOR 29 TO 42 DAYS | 12.0 | 11.5 | 11.0 | 10.5 | 10.0 | 9.0 |
| FOR 43 TO 56 DAYS | 13.5 | 13.0 | 12.5 | 12.0 | 11.5 | 10.5 |
| FOR 57 TO 84 DAYS | 15.0 | 14.5 | 14.0 | 13.5 | 13.0 | 12.0 |
| FOR 85 DAYS AND MORE | 18.0 | 17.5 | 17.0 | 16.5 | 16.0 | 15.0 |

FIG. 10

| | | LEAD SULFATE TO ACTIVE MATERIAL (% BY MASS) | |
|---|---|---|---|
| | | POSITIVE ELECTRODE | NEGATIVE ELECTRODE |
| AFTER CHARGING (AT TIMING A) | COMPARATIVE EXAMPLE 1 | 33.0 | 29.0 |
| DURING CHARGING (AT TIMING B) | COMPARATIVE EXAMPLE 2 | 18.0 | 10.0 |
| AFTER FULL CHARGING (AT TIMING D) | COMPARATIVE EXAMPLE 3 | 12.0 | 1.5 |
| | COMPARATIVE EXAMPLE 4 | 11.5 | 1.7 |
| AFTER REFRESH CHARGING (AT TIMING E) | INVENTIVE EXAMPLE 1 | 11.0 | 2.0 |
| | INVENTIVE EXAMPLE 2 | 6.7 | 4.3 |
| | INVENTIVE EXAMPLE 3 | 3.0 | 6.0 |
| AFTER OVERCHARGING | COMPARATIVE EXAMPLE 5 | 2.5 | 7.5 |
| | COMPARATIVE EXAMPLE 6 | 2.7 | 6.8 |

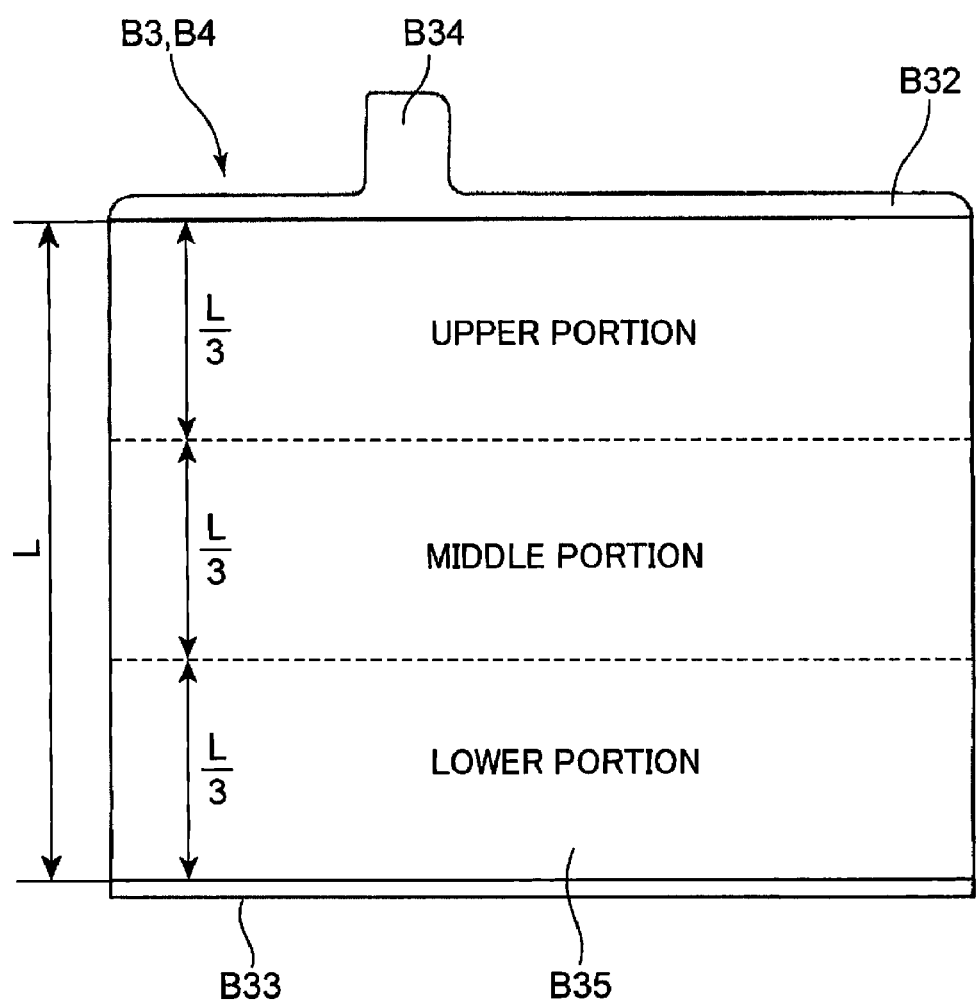

LEAD STORAGE BATTERY CHARGING CONTROL METHOD, CHARGING CONTROL CIRCUIT, POWER SOURCE DEVICE, AND LEAD STORAGE BATTERY

RELATED APPLICATIONS

This application is the U.S. National Phase under 35 U.S.C. §371 of International Application No. PCT/JP2010/003576, filed on May 27, 2010, which in turn claims the benefit of Japanese Application No. 2009-128465, filed on May 28, 2009, the disclosures of which Applications are incorporated by reference herein.

TECHNICAL FIELD

The present invention relates to a charging control method for refreshing a control valve type lead storage battery, a charging control circuit and a power source device using the charging control method, and a lead storage battery.

BACKGROUND ART

A lead storage battery (particularly, a control valve type lead storage battery) has been increasingly used as a drive source for an electric vehicle, other than for starting up an engine of a vehicle or for a backup power source. It is desirable to charge a lead storage battery rapidly in a short time, in view of a user's demand for constantly setting an electric vehicle in a driving ready state. In particular, in a vehicle for commercial use, there is a demand for charging the vehicle during a break time of the user.

In view of the above, there is known a charging method of charging a lead storage battery with a constant current, and changing a charging current value to be stepwise decremented, each time a terminal voltage of the lead storage battery reaches a predetermined threshold voltage. Such a charging method is known as a n-stage constant current charging method, because the charging current value is changed to be stepwise decremented (n−1) times (where n is an integer of 2 or larger), and charging is performed with current values of n-stages. The n-stage constant current charging method is known as a lead storage battery charging method that enables to obtain a large charging quantity of electricity in a short time (see e.g. patent literature 1).

Here, a lead storage battery is known to have characteristics that the higher the temperature is, the higher the charging efficiency is, and the lower the temperature is, the lower the charging efficiency is. Accordingly, if the lead storage battery is charged in the same manner without depending on a temperature, deficient charging is performed in a low-temperature condition, and overcharging is performed in a high-temperature condition. In view of this, patent literature 1 discloses an idea of performing proper charging of a lead storage battery without excess or deficiency by adjusting a second-stage (last stage) charging time depending on a temperature of the battery when charging is switched from first-stage charging to second-stage charging.

However, it is difficult to match the state of charge (hereinafter, called as SOC) of a lead storage battery to a fully charged state of 100% (a state where the dischargeable quantity of electricity is equal to a nominal capacity value) within a user's break time of about 10 to 60 minutes during work. Accordingly, charging is ended before the lead storage battery is brought to a fully charged state. Hereinafter, charging which is interrupted or ended before a fully charged state is reached is called as deficient charging. A lead storage battery used as a drive source for an electric vehicle repeats deficient charging.

Here, SOC represents a ratio of charged quantity of electricity to a full charging capacity of a battery in the unit of percentage (%).

If deficient charging and discharging are repeated, lead sulfate as a reaction product of discharging deposits on a positive electrode and on a negative electrode of the battery, namely, a degradation mode is generated. Such a degradation mode is called as sulfation. In order to eliminate the degradation, there is proposed an idea of performing refresh charging to eliminate sulfation by raising the SOC which is controllably set in the range of from about 50 to 70% in a normal operation condition to 100% i.e. by achieving a fully charged state (see e.g. patent literature 2). Specifically, patent literature 2 discloses that stepwise incrementing the SOC of a control valve type lead storage battery toward 100% is advantageous than instantaneously raising the SOC from a state where the SOC is kept to 70% to 100%.

However, the inventors of the present application found that sulfation cannot be sufficiently eliminated by setting the SOC of a lead storage battery to 100% as described above i.e. by refresh charging of performing proper charging without excess or deficiency, in the case where sulfation progresses resulting from repeating deficient charging and discharging as described above.

CITATION LIST

Patent Literature

Patent literature 1: Japanese Unexamined Patent Publication No. Hei 11-089104
Patent literature 2: Japanese Unexamined Patent Publication No. 2003-052129

SUMMARY OF INVENTION

An object of the invention is to provide a charging control method that enables to enhance the effect of eliminating sulfation resulting from repeating deficient charging of a lead storage battery, a charging control circuit and a power source device using the charging control method, and a lead storage battery which is less likely to generate sulfation resulting from repeating deficient charging.

A charging control circuit according to an aspect of the invention is provided with a temperature measuring unit which measures a temperature of a lead storage battery; a charging unit which charges the lead storage battery; a full charging controller which controls the charging unit to charge the lead storage battery until the lead storage battery is fully charged; a refresh charging controller which controls the charging unit to perform refresh charging of charging the lead storage battery with a predetermined refresh charging quantity of electricity, after the lead storage battery has been fully charged; and a refresh charging quantity setter which sets the refresh charging quantity of electricity in the refresh charging of the lead storage battery which has been fully charged at a present time, depending on the temperature of the lead storage battery measured by the temperature measuring unit throughout a deficient charging period, the deficient charging period being a period from a time when the lead storage battery has been fully charged at a previous time to a time when the lead storage battery has been fully charged at the present time by the full charging controller.

A power source device according to another aspect of the invention is provided with the aforementioned charging control circuit, and the lead storage battery.

A charging control method according to yet another aspect of the invention includes a full charging step of charging a lead storage battery until the lead storage battery is fully charged; a refresh charging step of performing refresh charging of charging the lead storage battery with a predetermined refresh charging quantity of electricity, after the lead storage battery has been fully charged; and a refresh charging quantity setting step of setting the refresh charging quantity of electricity in the refresh charging step for the lead storage battery which has been fully charged at a present time, depending on a temperature of the lead storage battery throughout a deficient charging period, the deficient charging period being a period from a time when the lead storage battery has been fully charged at a previous time to a time when the lead storage battery has been fully charged at the present time in the full charging step.

A lead storage battery according to yet another aspect of the invention is provided with a positive electrode plate which holds a positive electrode active material; and a negative electrode plate which holds a negative electrode active material, wherein the content rate of lead sulfate relative to the positive electrode active material is set in the range of from 3% by mass to 11% by mass, and the content rate of lead sulfate relative to the negative electrode active material is set in the range of from 2% by mass to 6% by mass by the refresh charging by the aforementioned charging control method.

A lead storage battery according to still another aspect of the invention is provided with a positive electrode plate which holds a positive electrode active material; and a negative electrode plate which holds a negative electrode active material, wherein the content rate of lead sulfate relative to the positive electrode active material is set in the range of from 3% by mass to 11% by mass, and the content rate of lead sulfate relative to the negative electrode active material is set in the range of from 2% by mass to 6% by mass.

BRIEF DESCRIPTION OF DRAWINGS

FIG. 5 is an explanatory diagram showing an example of a lookup table to be stored in a storage.

FIG. 10 is a table showing a measurement result on the content rate of lead sulfate relative to each of a positive electrode active material and a negative electrode active material, in the case where overcharging is performed at timings A, B, C, D, E in FIG. 8, and thereafter.

FIG. 11 is an explanatory diagram for describing in detail a distribution of lead sulfate on a positive electrode plate and on a negative electrode plate.

DESCRIPTION OF EMBODIMENTS

Figure 1:
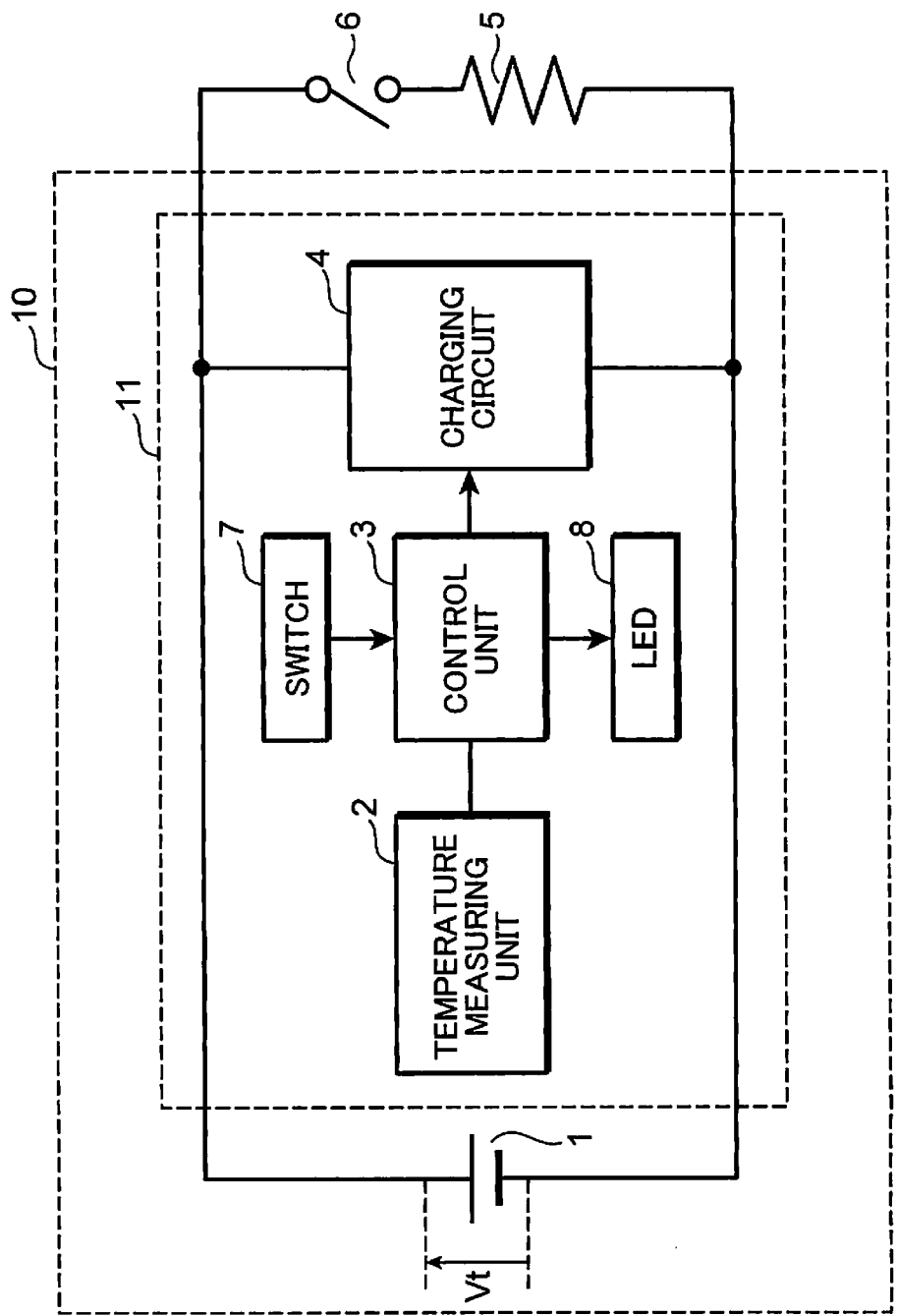
FIG. 1 is a block diagram showing an example of a charging control circuit, a power source device, and a lead storage battery using a charging control method as an embodiment of the invention.

A charging control method according to an aspect of the invention is a lead storage battery charging control method of performing refresh charging immediately after last-time deficient charging, after repeating deficient charging indicating that the state of charge (SOC) of the battery does not reach 100%, and discharging. The charging quantity of electricity in refresh charging is changed in correlation with a battery jar temperature in the case where deficient charging and discharging are repeated.

After an intensive study, the inventors have elucidated a reason why a sufficient refreshing effect cannot be obtained, in other words, sulfation cannot be sufficiently eliminated by a method of fully charging a lead storage battery by proper charging without excess or deficiency. Further, the inventors conceived a charging control method capable of exhibiting a sufficient refreshing effect, based on the estimated reason. In the following, a degradation mechanism which the inventors have elucidated is described in detail.

Let us presume a case that a lead storage battery is used as a drive source for an electric vehicle. A user (a driver of an electric vehicle) performs deficient charging by leaving the electric vehicle outdoors during a break time of about 10 to 60 minutes, and then drives the electric vehicle after the deficient charging. Since the lead storage battery which has been left outdoors may be exposed to direct sunlight or may be subjected to radiation cooling at nighttime, deficient charging and discharging are repeated in a condition that the battery is exposed to various ambient temperatures ranging from a high temperature near 80° C. to a low temperature below zero. Further, in early spring or late fall, for instance, a temperature difference between night and day is large, and the temperature environment greatly changes even in a day.

Here, the inventors found that the ratio of lead sulfate that deposits on a positive electrode and on a negative electrode is increased, as the temperature of a lead storage battery which repeats deficient charging and discharging is increased. Presumably, this phenomenon occurs as follows. After lead sulfate deposits on a positive electrode and on a negative electrode resulting from deficient charging, a part of the lead sulfate is crystallized and is stabilized (namely, re-charging is less feasible). The higher the temperature is, the more crystallization of lead sulfate progresses.

Accordingly, as described above, in the case where the lead storage battery is left outdoors, for instance, the degree of crystallization of lead sulfate greatly differs depending on the temperature environment. As a result, even if the lead storage battery is fully charged without depending on the degree of crystallization of lead sulfate, crystallization of lead sulfate cannot be eliminated, and consequently, the performance of the lead storage battery cannot be recovered.

For instance, in the charging method disclosed in patent literature 1, only the second-stage (last-stage) charging time is adjusted depending on a battery temperature when charging is switched from first-stage charging to second-stage charging. Accordingly, charging is controlled without depending on the degree of crystallization of lead sulfate that has already deposited, before first-stage charging is started. Thus, it is impossible to eliminate crystallization of lead sulfate.

Contrary to the above, the charging method disclosed in patent literature 1 is directed to an arrangement of performing proper charging without excess or deficiency, in view of the property of the lead storage battery that the higher the temperature is, the higher the charging efficiency is, and the lower the temperature is, the lower the charging efficiency is. Accordingly, the charging quantity of electricity resultantly decreases in a high-temperature and high-charging-efficiency condition. Conceivably, crystallization of lead sulfate progresses in a high-temperature condition, in view of crystallization behavior of lead sulfate. Therefore, reducing the charging quantity of electricity in such a high-temperature condition may reduce the effect of eliminating crystallization of lead sulfate against the intention.

In the following, an embodiment of the invention is described referring to the drawings. Elements having the same reference numerals throughout the drawings have the same arrangements, and repeated description thereof is omitted herein. FIG. 1 is a block diagram showing an example of a charging control circuit, a power source device, and a lead storage battery using a charging control method embodying the invention.

A power source device 10 shown in FIG. 1 is provided with a lead storage battery 1, and a charging control circuit 11. An electric apparatus is configured such that a load 5 is connected to the power source device 10 via e.g. a power source switch 6. The load 5 is e.g. a motor, and the electric apparatus is e.g. an electric vehicle.

The charging control circuit 11 is provided with a temperature measuring unit 2, a control unit 3, a charging circuit 4 (a charging unit), a switch 7, and an LED (Light Emitting Diode) 8. The switch 7 is an operation switch to be operated by the user, and is connected to the control unit 3.

Figure 2:
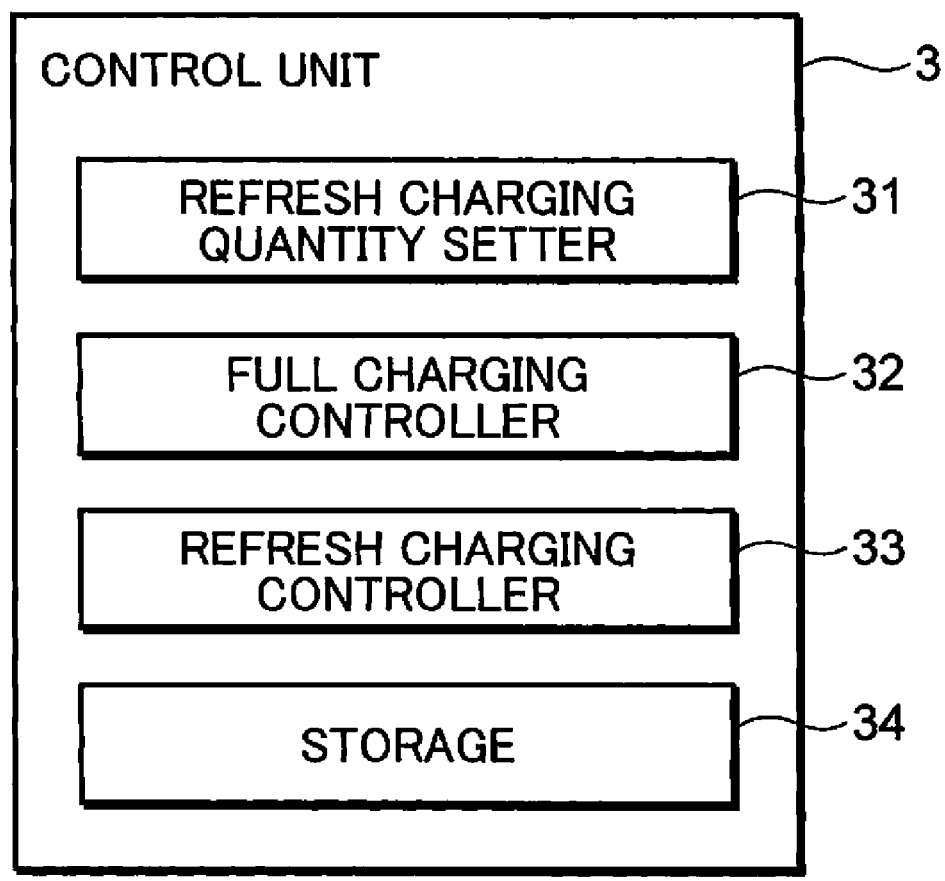
FIG. 2 is a block diagram showing an example of an arrangement of a control unit shown in FIG. 1.

FIG. 2 is a block diagram showing an example of a configuration of the control unit 3 shown in FIG. 1. The control unit 3 shown in FIG. 2 is constituted of a CPU (Central Processing Unit) which performs e.g. a predetermined computation processing, an ROM (Read Only Memory) which stores a predetermined control program, an RAM (Random Access Memory) which temporarily stores data, a timer circuit, a storage 34 constituted of e.g. an ROM, and peripheral circuits thereof.

The control unit 3 functions as a refresh charging quantity setter 31, a full charging controller 32, and a refresh charging controller 33 by executing a control program stored in the ROM.

Figure 3:
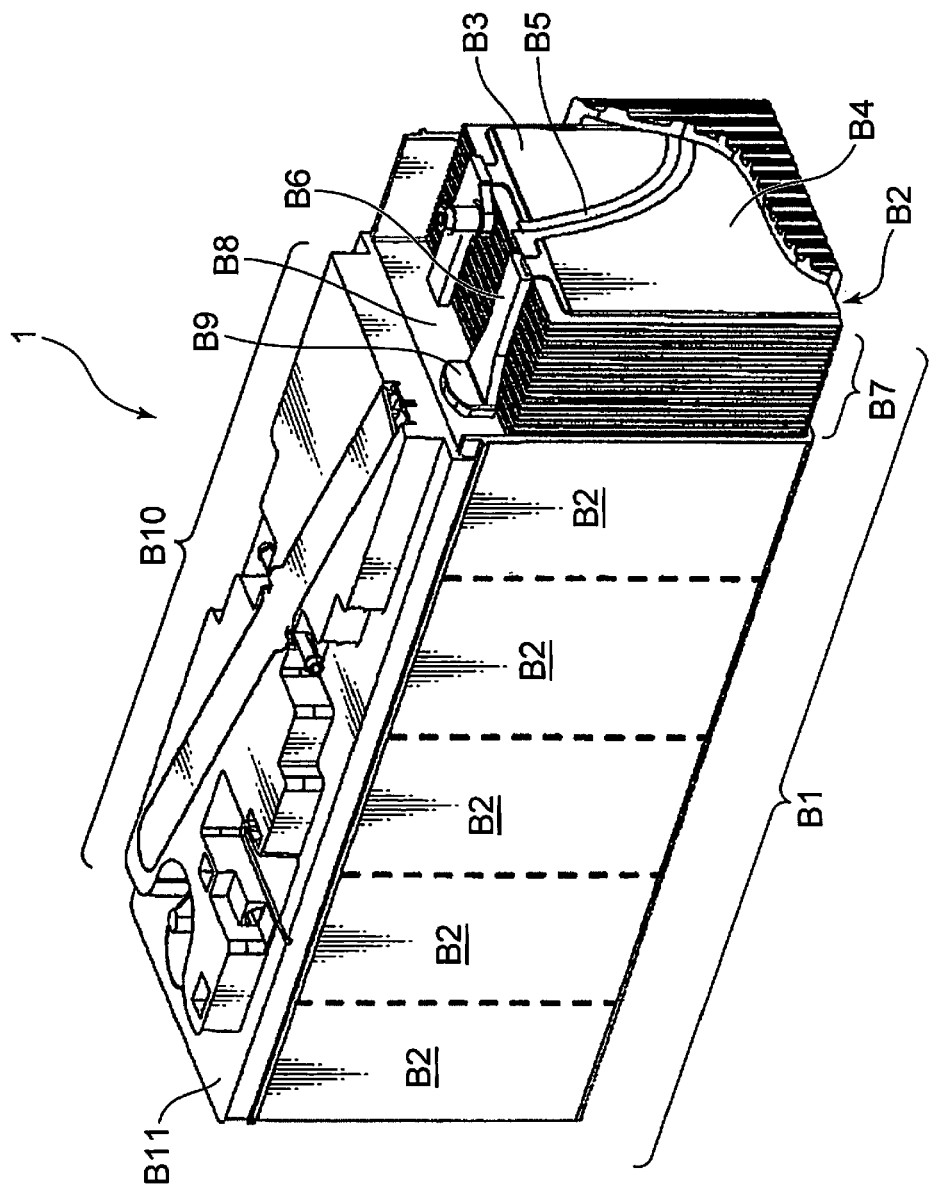
FIG. 3 is a construction diagram showing an example of the lead storage battery shown in FIG. 1.

FIG. 3 is a construction diagram showing an example of the lead storage battery 1 shown in FIG. 1. The lead storage battery 1 shown in FIG. 3 is an example of a control valve type lead storage battery. The lead storage battery 1 shown in FIG. 3 is constructed by aligning a plurality of cells B2 in one direction in a battery jar B1 composed of polypropylene resin. Each of the cells B2 is constructed such that positive electrode plates B3 and negative electrode plates B4 are laminated one over the other via respective separators B5 made of glass fiber as a main ingredient. Electrode plate groups B7 each obtained by bundling the electrode plates of the same polarity by a strap B6 are housed in the battery jar B1.

Each electorate plate group B7 is connected to the electrode plate group B7 of the adjacent cell by a connector B9 via a partition wall B8. The lead storage battery 1 is constructed by integrally welding a lid B11 provided with an exhaust structure B10 communicating with each cell, to a top portion of the battery jar B1. Further, an electrolyte is impregnated in the separators B5.

Figure 4:
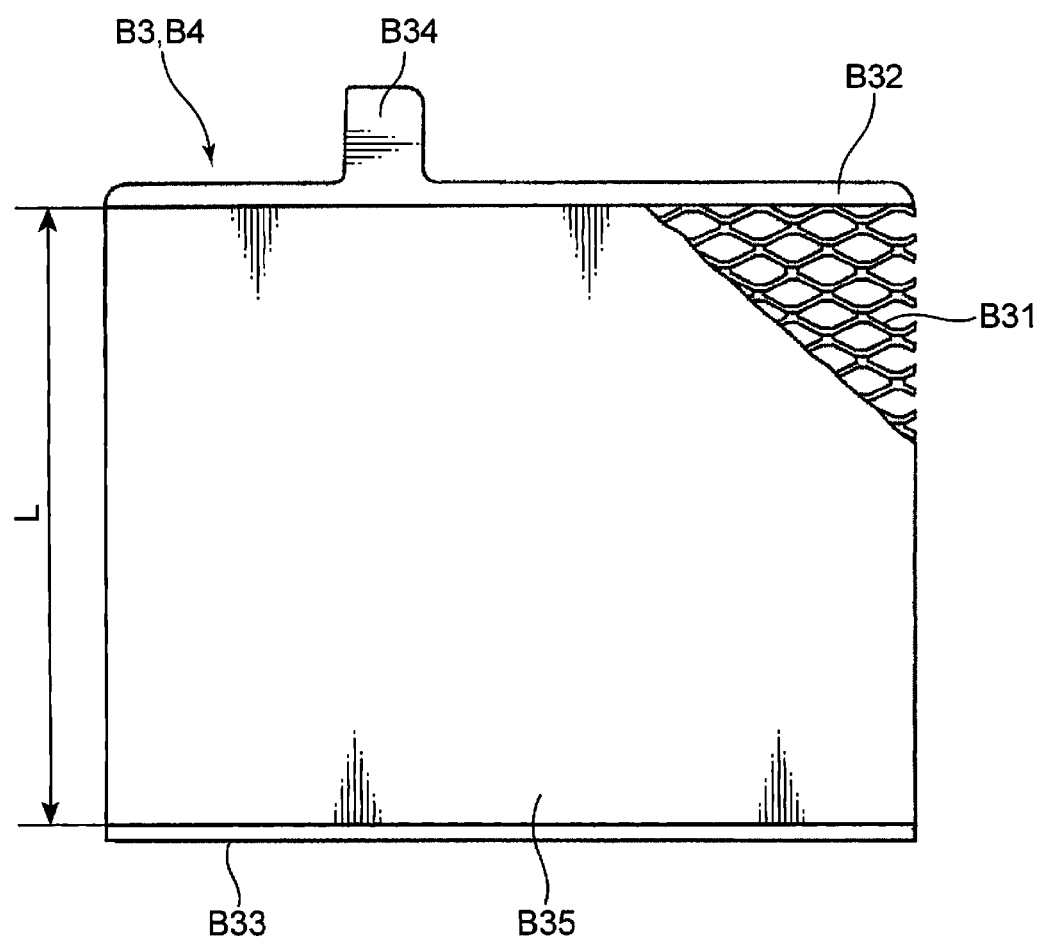
FIG. 4 is a construction diagram showing an example of a positive electrode plate and a negative electrode plate shown in FIG. 3.

FIG. 4 is a construction diagram showing an example of one positive electrode plate 3 and one negative electrode plate B4 shown in FIG. 3. The positive electrode plate B3 and the negative electrode plate B4 are constructed such that an upper frame B32 is attached to an upper end of a grid-shaped middle portion B31, a lower frame B33 is attached to a lower end of the middle portion B31, a collecting tab B34 (a collecting portion) is formed on the upper frame B32, and an active material B35 is charged (coated) in the middle portion B31 (and a part of the upper frame B32, the lower frame B33), whereby a part (a major part) of the positive electrode plate B3 and of the negative electrode plate B4 is covered by the active material B35.

As described above, the collecting tab B34 is formed on an upper end of the positive electrode plate B3 and of the negative electrode plate B4. Further, the positive electrode plate B3 and the negative electrode plate B4 are disposed to extend along a vertical direction, with the upper frame B32 and the lower frame B33 being disposed at upper and lower positions. The length L shown in FIG. 4 is equal to the length of a portion covered by the active material B35 in a vertical direction. The length L of the positive electrode plate B3, and of the negative electrode plate B4 is e.g. not smaller than 100 mm but not larger than 200 mm.

The temperature measuring unit 2 is disposed in proximity to the lead storage battery 1, or disposed in firm contact with the battery jar B1 of the lead storage battery 1. With this arrangement, the temperature measuring unit 2 measures the temperature T of the lead storage battery 1, and outputs information representing the temperature T to the control unit 3.

The temperature measuring unit 2 may be e.g. a thermistor, or may be a so-called thermo viewer i.e. a radiation thermometer for measuring a temperature of the lead storage battery 1 in a state that the radiation thermometer is disposed away from the battery jar of the lead storage battery 1 by a certain distance.

The charging circuit 4 is constituted of e.g. a switching power source circuit. The charging circuit 4 supplies a charging current to the lead storage battery 1 in response to a request from the control unit 3.

The full charging controller 32 controls the charging circuit 4 to charge the lead storage battery 1 by e.g. a multi-stage (n-stage) constant current charging system to thereby charge the lead storage battery 1 until a fully charged state is reached. The charging control circuit 11 is provided with e.g. an unillustrated voltage detecting circuit (a voltage detector) which detects a terminal voltage Vt between both ends of the lead storage battery 1, and an unillustrated timer circuit (a time measuring unit) which measures a charging time tm required for e.g. first-stage constant current charging. The full charging controller 32 performs multi-stage constant charging by using the voltage detecting circuit and the timer circuit.

Specifically, the full charging controller 32 controls e.g. the charging circuit 4 to repeatedly perform constant current charging, a certain number of times, of supplying a predetermined set current value Is until the terminal voltage Vt of the lead storage battery 1 is equal to a predetermined threshold voltage Vth, and decreases the set current value Is each time the constant current charging is performed. After the constant current charging is performed the certain number of times by the charging circuit 4, the full charging controller 32 controls the charging circuit 4 to supply a predetermined complementary charging quantity of electricity Qc to the lead storage battery 1, whereby the lead storage battery 1 is fully charged.

The threshold voltage Vth is set to a charging voltage capable of obtaining high charging efficiency for the lead storage battery 1, and is set to a voltage value lower than a fully charged voltage at a closed circuit voltage during charging. Accordingly, it is impossible to fully charge the lead storage battery 1 by merely repeating constant current charging until the terminal voltage Vt is equal to the threshold voltage Vth. In view of this, the complementary charging quantity of electricity Qc required for fully charging the lead storage battery 1 which has undergone the constant current charging a predetermined number of times, is e.g. empirically obtained and set.

Alternatively, a complementary charging quantity of electricity Qc capable of fully charging the lead storage battery 1 with enhanced precision may be obtained by correcting the thus obtained complementary charging quantity of electricity Qc based on e.g. a temperature or based on a charging time tm. Further alternatively, a complementary charging time tcm required for charging the lead storage battery 1 with the complementary charging quantity of electricity Qc may be used, in place of using the complementary charging quantity of electricity Qc, because the charging quantity of electricity is determined by a charging time in constant current charging.

Here, it is possible to confirm that the lead storage battery 1 has been fully charged when the OCV (Open Circuit Voltage) of the lead storage battery 1 is equal to the fully charged voltage of the lead storage battery 1. The fully charged voltage of the lead storage battery 1 constructed by series-connecting six cells changes in accordance with the specific gravity (concentration) of the electrolyte, and lies in the range of e.g. from 12.7V to 13.5V. Accordingly, in a strict sense, it is possible to specify a fully charged voltage of the lead storage battery 1 corresponding to a specific gravity of the electrolyte by measuring the specific gravity of the electrolyte. In this embodiment, the fully charged voltage of the lead storage battery 1 constructed by series-connecting six cells has been exemplarily described. If a lead storage battery is constructed by series-connecting cells of a number other than six is used, the fully charged voltage varies depending on the ratio of the number of series-connected cells to six.

Since a charging current flows in the lead storage battery 1 during charging, it is impossible to measure OCV, and it is difficult to check whether the lead storage battery 1 has been fully charged based on OCV.

In view of this, in a multi-stage constant current charging system or other charging systems, the lead storage battery 1 is fully charged by using a method capable of estimating that the lead storage battery 1 has been fully charged without measuring OCV, as a charging end requirement, and by charging the lead storage battery 1 until such a charging end requirement is satisfied. For instance, in the aforementioned full charging controller 32, a time when supply of the complementary charging quantity of electricity Qc to the lead storage battery 1 has ended is a time when the charging end requirement has been satisfied, in other words, a time when the lead storage battery 1 has been fully charged.

Thus, it is possible to confirm that the lead storage battery 1 has been fully charged when charging by the full charging controller 32 has ended, in other words, when a charging end requirement capable of estimating that full charging has been completed has been satisfied, without the need of checking whether the lead storage battery 1 has been fully charged by directly measuring OCV of the lead storage battery 1.

It is needless to say that a fully charged state of the lead storage battery 1 may be confirmed by stopping the charging and checking whether OCV of the lead storage battery 1 is equal to the fully charged voltage.

Alternatively, in the case where the user intends to complete the charging within a short time e.g. within one hour, a deficient charging controller which charges the lead storage battery 1 within the intended time, and which performs deficient charging of terminating the charging without fully charging the lead storage battery 1 may be provided, in addition to the full charging controller 32. In the case where the lead storage battery 1 is charged by the deficient charging controller, or the user interrupts the charging without waiting for completion of charging during the charging by the full charging controller 32, in other words, without fully charging the lead storage battery 1, the lead storage battery 1 is deficiently charged.

As far as the lead storage battery 1 is fully charged, the full charging controller 32 may not perform charging with the complementary charging quantity of electricity Qc. Further alternatively, the charging system of the full charging controller 32 is not limited to the multi-stage constant current charging system. For instance, CCCV (Constant Current Constant Voltage) charging may be performed, or other charging system may be performed.

After the lead storage battery 1 is fully charged by the full charging controller 32, in other words, after the charging end requirement on multi-stage constant current charging is satisfied, and multi-stage constant current charging is ended, the refresh charging controller 33 subsequently controls the charging circuit 4 to perform refresh charging of charging the lead storage battery 1 with a refresh charging quantity of electricity Qr set by the refresh charging quantity setter 31.

The refresh charging quantity setter 31 sets the refresh charging quantity of electricity Qr in refresh charging of the lead storage battery 1 which has been fully charged at a present time in such a manner that the refresh charging quantity of electricity Qr is increased, as the temperature of the lead storage battery 1 measured by the temperature measuring unit 2 is increased throughout a deficient charging period from a time when the lead storage battery 1 has been fully charged at a previous time to a time when the lead storage battery 1 has been fully charged at the present time by the full charging controller 32.

The storage 34 stores in advance temperature coefficients $Q_1, Q_2, \ldots, Q_n$ correlated with temperatures $T_1, T_2, \ldots, T_n$ of the lead storage battery 1. The temperature coefficients $Q_1, Q_2, \ldots, Q_n$ are empirically obtained by e.g. the following process.

For instance, in order to obtain the temperature coefficient $Q_1$, sulfation is generated by repeating deficient charging and discharging of the lead storage battery 1 in the environment of the temperature $T_1$ during e.g. a predetermined time is per day. After the lead storage battery 1 with sulfation is temporarily fully charged, the lead storage battery 1 is charged again to eliminate the sulfation. With this operation, the charging quantity of electricity required until sulfation is eliminated after full charging, in other words, until a sufficient refreshing effect is obtained is set as a charging quantity of electricity $W_1$ corresponding to the temperature $T_1$.

Determination as to whether sulfation has been eliminated may be made by e.g. checking whether lead sulfate has been crystallized through microscopic observation of an active material on the positive electrode and on the negative electrode of the lead storage battery 1; or by determination as to whether the discharging quantity of electricity obtained by completely discharging the lead storage battery 1 is equal to the full charging quantity of electricity of the lead storage battery 1 in a brand new state.

Dividing the thus obtained charging quantity of electricity $W_1$ by the temperature $T_1$ yields the temperature coefficient $Q_1$ ($Q_1=W_1/T_1$). Acquiring the charging quantity of electricity $W_2$ and the temperature coefficient $Q_2$ with respect to the temperature $T_2$ according to the above process, and repeating the above process yields the temperature coefficients $Q_1$, $Q_2, \ldots, Q_n$ corresponding to the temperatures $T_1, T_2, \ldots, T_n$. Here, if $T_1>T_2>T_n$, $W_1>W_2>W_n$, and $Q_1>Q_2>Q_n$.

The storage 34 stores in advance the thus obtained temperature coefficients $Q_1, Q_2, \ldots, Q_n$ in correlation with the temperatures $T_1, T_2, \ldots, T_n$. Here, the temperature coefficients $Q_1, Q_2, \ldots, Q_n$ represent charging quantities of electricity capable of substantially eliminating sulfation per unit time resulting from charging and discharging of the lead storage battery 1 without achieving a fully charged state at the corresponding temperatures $T_1, T_2, \ldots, T_n$.

The refresh charging quantity setter 31 monitors temperatures of the lead storage battery 1 measured by the temperature measuring unit 2 during a total time $t_A$ when deficient charging and discharging are repeated until refresh charging is performed, in other words, during a deficient charging period from a time when the lead storage battery 1 has been fully charged at a previous time to a time when the lead storage battery 1 has been fully charged at a present time by the full charging controller 32; and acquires times $t_1, t_2, \ldots, t_n$, wherein the time $t_1$ is a duration of time when the temperature of the lead storage battery 1 is $T_1$, the time $t_2$ is a duration of time when the temperature of the lead storage battery 1 is $T_2, \ldots$, and the time $t_n$ is a duration of time when the temperature of the lead storage battery 1 is $T_n$. In this case, $t_A=t_1+t_2+\ldots+t_n$.

Then, the refresh charging quantity setter 31 reads out the temperature coefficients $Q_1, Q_2, \ldots, Q_n$ correlated with the temperatures $T_1, T_2, \ldots, T_n$, and calculates an optimum refresh charging quantity of electricity Qr, using the following equation (1).

$$Qr=Q_1t_1+Q_2t_2+\ldots+Q_nt_n \quad (1)$$

The refresh charging quantity setter 31 does not necessarily calculate the refresh charging quantity of electricity Qr based on the equation (1). For instance, as far as a substantial effect as described above can be obtained, the refresh charging quantity of electricity Qr may be acquired by using a lookup table (LUT) as shown in e.g. FIG. 5.

The lookup table shown in FIG. 5 is an example of a data table stored in the storage 34. The data table is obtained by calculating a refresh charging quantity of electricity Qr corresponding to a deficient charging period $T_A$, and temperatures of the lead storage battery 1 during a deficient charging period by using the equation (1) in advance. A time-based average value of the temperatures of the lead storage battery 1 during a deficient charging period may be used as the temperature of the lead storage battery 1 during the deficient charging period.

Then, the refresh charging quantity setter 31 may control e.g. an unillustrated timer circuit to measure a deficient charging period $t_A$, calculate a time-based average value of the temperatures T measured by the temperature measuring unit 2 as the temperature of the lead storage battery 1 during the deficient charging period, and acquire a refresh charging quantity of electricity Qr which is stored in the lookup table in correlation with the thus obtained deficient charging period $t_A$ and with the thus obtained temperature of the lead storage battery 1.

Acquiring the refresh charging quantity of electricity Qr by using the simplified lookup table as described above also enables to obtain a sufficient refreshing effect in a practical sense.

As described above, setting the refresh charging quantity of electricity Qr by using e.g. the equation (1) or the lookup table as shown in FIG. 5 yields a refresh charging quantity of electricity Qr capable of effectively eliminating sulfation, depending on the amount of lead sulfate which is estimated to deposit on the positive electrode and on the negative electrode of the lead storage battery 1 before refresh charging is started. Specifically, in the case where it is estimated that crystallization of lead sulfate progresses i.e. sulfation progresses in a high-temperature condition of the lead storage battery 1 during a deficient charging period, the refresh charging quantity of electricity Qr is increased, and the effect of eliminating sulfation resulting from refresh charging is increased.

Thus, it is possible to obtain an enhanced refreshing effect even in a condition where it is difficult to estimate the deposited amount of lead sulfate resulting from e.g. repeating deficient charging and discharging in different temperature conditions.

The refresh charging quantity setter 31 may increase the thus obtained refresh charging quantity of electricity Qr, as the charging quantity of electricity at a first-time constant current charging out of a certain number of times of constant current charging by the aforementioned multi-stage constant current charging is increased. Here, since the charging quantity of electricity at the first-time constant current charging is proportional to the charging time tm of the first-time constant current charging, an increase in the charging time tm means an increase in the charging quantity of electricity at the first-time constant current charging.

First-time (first-stage) constant current charging in the multi-stage constant current charging is performed until the terminal voltage Vt of the lead storage battery 1 is equal to the threshold voltage Vth after charging is started. Then, as the SOC (State of Charge) of the lead storage battery 1 before charging is started is decreased, the charging quantity of electricity required for raising the terminal voltage Vt to the threshold voltage Vth is increased. Thus, an increase in the charging quantity of electricity (an increase in the charging time tm) at the first-time constant current charging means a decrease in the SOC of the lead storage battery 1 before charging is started.

Contrary to the above, as discharging of the lead storage battery 1 progresses until the SOC of the lead storage battery 1 is lowered, lead sulfate is likely to deposit. Thus, an increase in the charging quantity of electricity (an increase in the charging time) at the first-time constant current charging means that the lead storage battery 1 is exposed to a condition where lead sulfate is likely to deposit before charging is started.

As described above, an increase in the charging quantity of electricity (an increase in the charging time) at the first-time constant current charging increases the refresh charging quantity of electricity Qr, and an increase in the estimated deposited amount of lead sulfate increases the refresh charging quantity of electricity Qr, whereby the effect of eliminating crystallization of lead sulfate can be increased. Thus, it is possible to increase the effect of eliminating sulfation.

As described above, with use of the charging control circuit 11 shown in FIG. 1, it is possible to set a charging quantity of electricity that accurately reflects a temperature environment in which the lead storage battery lies in performing refresh charging. Thus, it is possible to recover the lead sulfate deposited on the positive electrode and on the negative electrode to an active state with enhanced reliability.

Figure 6:
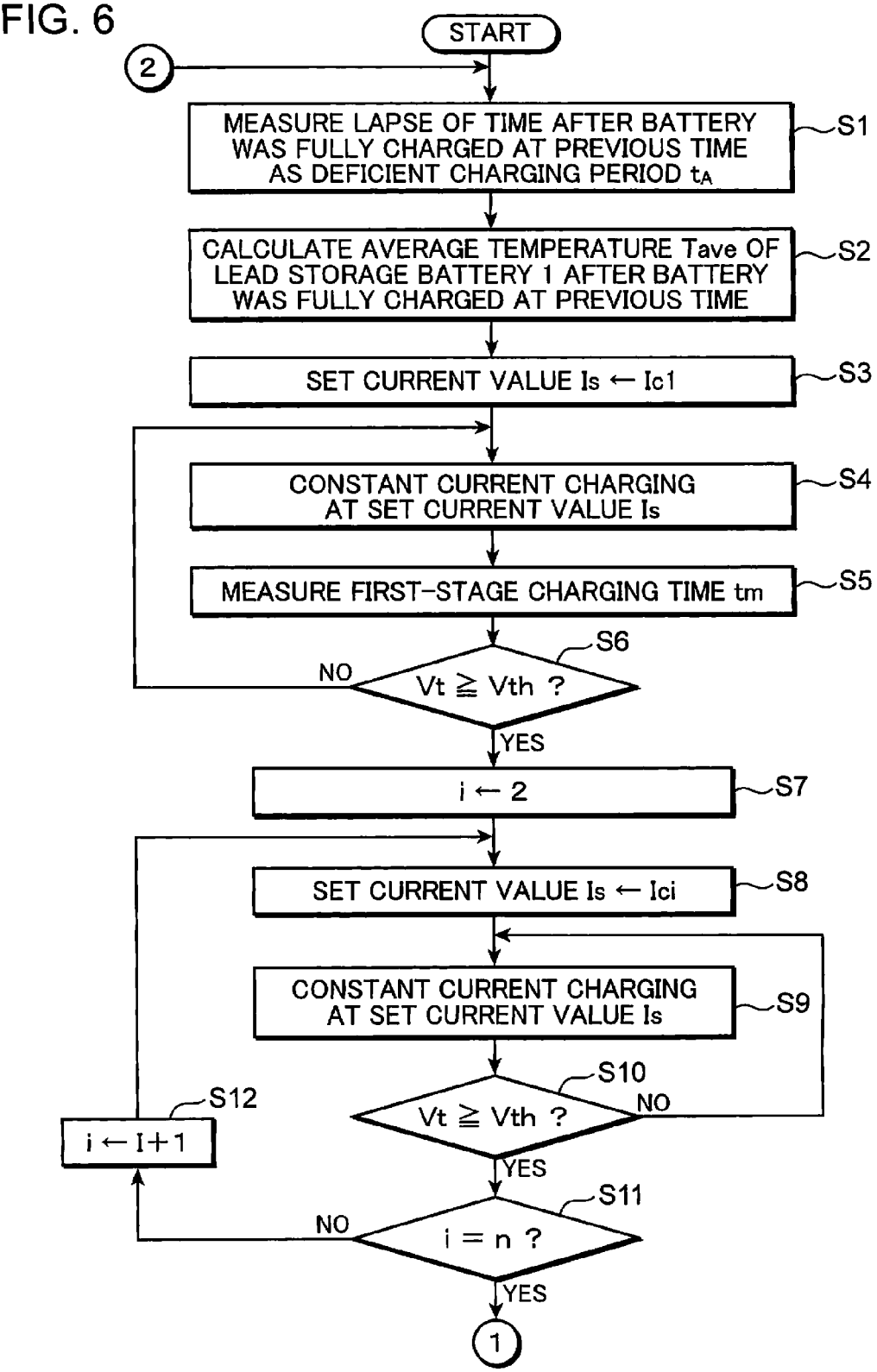
FIG. 6 is a first-half flowchart showing an example of an operation of the charging control circuit shown in FIG. 1, in other words, an example of a charging control method according to an aspect of the invention.
Figure 7:
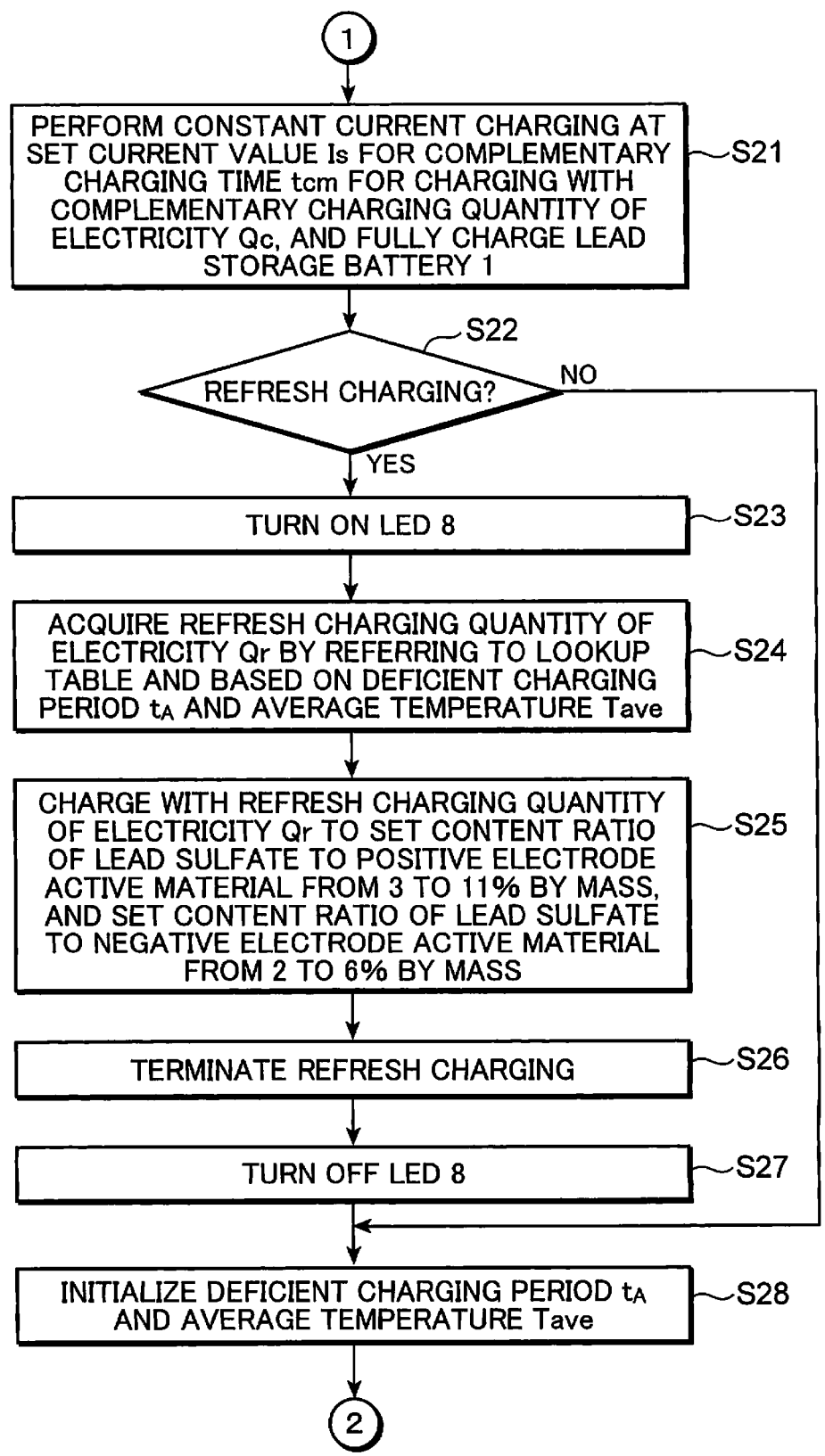
FIG. 7 is a second-half flowchart showing the example of the operation of the charging control circuit shown in FIG. 1, in other words, the example of the charging control method according to the aspect of the invention.

FIGS. 6, 7 are flowcharts showing an example of an operation of the charging control circuit 11 shown in FIG. 1, namely, an example of a charging control method according to an aspect of the invention.

Figure 8:
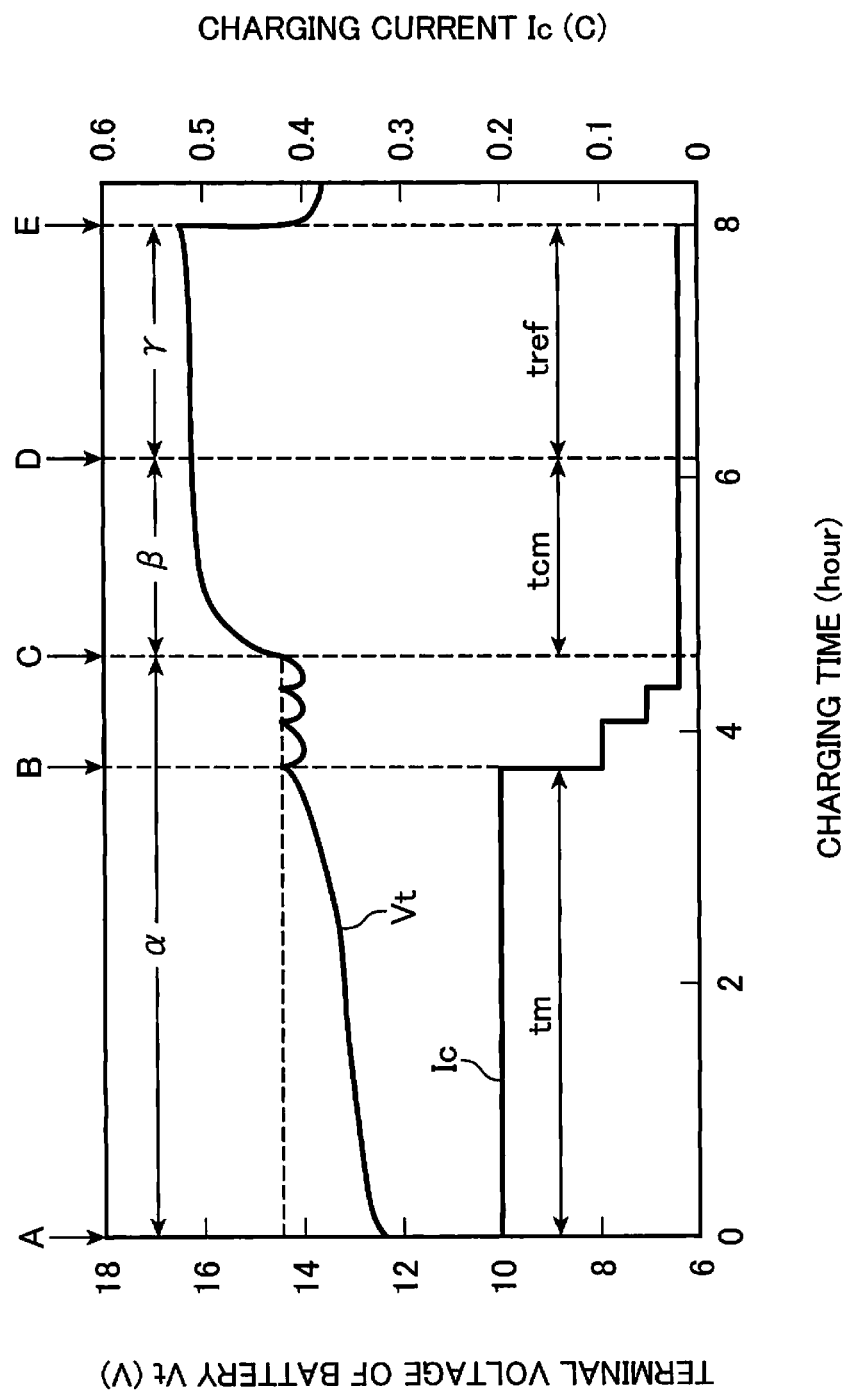
FIG. 8 is an explanatory diagram showing an example of a change in a terminal voltage and in a charging current in the case where a lead storage battery is charged by the charging control circuit.

FIG. 8 is an explanatory diagram showing an example of a change in the terminal voltage Vt and in the charging current Ic in charging the lead storage battery 1 by the charging control circuit 11. FIG. 8 shows an example of a charging pattern of refresh charging which is performed by the refresh charging controller 33 consecutively after the lead storage battery 1 is fully charged by multi-stage constant current charging where n=4 i.e. four-stage constant current charging of decrementing the current value three times by the full charging controller 32.

The symbol "C" of "charging current (C)" in FIG. 8 indicates a current value in the case where the below-mentioned "1C" is used as one unit. Here, 1C is a current value that makes the SOC of a battery to 0% (the accumulated quantity of electricity is zero) within one hour, in the case where the battery is discharged with a current value of 1C during a period when the SOC is changed from 100% to 0%, in other words, in the case where the battery is discharged with a nominal capacity value i.e. a current value of 1C. The symbol "C" is also called as "It".

FIG. 8 shows an example, wherein the current value Ic1 as the first-stage set current value Is is 0.2 C, the current value Ic2 as the second-stage set current value Is is 0.1 C, the current value Ic3 as the third-stage set current value Is is 0.05 C, the current value Ic4 as the fourth-stage set current value Is is 0.025 C, and the threshold voltage Vth is 14.4V. 14.4V is an example of the threshold voltage Vth, in the case where the temperature T of the lead storage battery 1 is 25° C. The threshold voltage Vth is not limited to 14.4V, but may be set to a proper value, as necessary.

Firstly, the refresh charging quantity setter 31 measures an elapsed time after the battery has been fully charged at a previous time, as a deficient charging period $t_A$ (Step S1).

Here, the time when the battery has been fully charged at a previous time is a time when the lead storage battery 1 has been fully charged most recently. The time when the battery is fully charged at a previous time is e.g. a time when a most-recent phenomenon has occurred, out of the time when OCV of the lead storage battery 1 is determined to be equal to a fully charged voltage, the time when the lead storage battery 1 is determined to be fully charged after completion of charging by the full charging controller 32, and the time when refresh charging by the refresh charging controller 33 is completed.

Next, the refresh charging quantity setter 31 calculates an average temperature Tave of the lead storage battery 1 after the battery has been fully charged at a previous time, based on the temperature T measured by the temperature measuring unit 2 (Step S2).

The operations in Steps S1, S2 are constantly and continuously performed concurrently with the following operations, so that the deficient charging period $t_A$ and the average temperature Tave are constantly updated to a latest value.

Next, the full charging controller 32 sets the current value Ic1 as the set current value Is (Step S3). Then, the charging circuit 4 supplies a charging current of the set current value Is to the lead storage battery 1, in response to a control signal from the full charging controller 32, to charge the lead storage battery 1 with a constant current (Step S4 or the timing A). Then, the full charging controller 32 controls e.g. the unillustrated timer circuit to measure a first-stage charging time tm (Step S5).

As shown in FIG. 8, constant current charging by a current value of 0.2 C is performed by the constant current charging in Step S4, and the terminal voltage Vt is gradually increased.

The full charging controller 32 compares between the terminal voltage Vt and the threshold voltage Vth (Step S6). If the terminal voltage Vt is smaller than the threshold voltage Vth (NO in Step S6), the routine repeats Steps S4 to S6. Then, if the terminal voltage Vt is equal to or larger than the threshold voltage Vth (YES in Step S6 or the timing B), the first-stage charging time tm is acquired, and "2" is substituted in the variable i to start second-stage constant current charging (Step S7).

Next, the full charging controller 32 sets the current value Ici (Ic2=0.1 C, Ic3=0.05 C, Ic4=0.025 C) as the set current value Is (Step S8). Then, the charging circuit 4 supplies a charging current of the set current value Is to the lead storage battery 1, in response to a control signal from the full charging controller 32, to charge the lead storage battery 1 with a constant current (Step S9).

Then, the full charging controller 32 compares between the terminal voltage Vt and the threshold voltage Vth (Step S10). If the terminal voltage Vt is smaller than the threshold voltage Vth (NO in Step S10), the routine repeats Steps S9 to S10. Then, if the terminal voltage Vt is equal to or larger than the threshold voltage Vth (YES in Step S10), the full charging controller 32 compares between the variable i and n (where n=4) so as to check whether charging is completed until the last-stage (n) (Step S11).

If the variable i is not equal to n (NO in Step S11), the variable i is incremented by one to perform next-stage constant current charging (Step S12), and the routine repeats Steps S8 to S11. On the other hand, if the variable i is equal to n (YES in Step S11 or the timing C), the routine proceeds to Step S21 to fully charge the lead storage battery 1.

The multi-stage constant current charging from Step S3 to Step 11 corresponds to a region α in FIG. 8.

Next, in Step S21, the full charging controller 32 performs constant current charging with the set current value Is only for the complementary charging time tcm (Step S21). Thus, the lead storage battery 1 is charged with the complementary charging quantity of electricity Qc, whereby the lead storage battery 1 is fully charged (at the timing D).

Next, the refresh charging controller 33 checks whether refresh charging is to be performed (Step S22). For instance, the refresh charging controller 33 checks the switch 7, and in the case where an operation command to perform refresh charging from the user is accepted by the switch 7, the routine proceeds to Step S23 so as to perform refresh charging (YES in Step S22).

Alternatively, the refresh charging controller 33 may proceed to Step S23 (YES in Step S22) so as to perform refresh charging by using a predetermined time interval as a refresh start requirement, in other words, so as to perform refresh charging at a predetermined time interval of e.g. once per seven days during a deficient charging period. Further alternatively, the refresh charging controller 33 may proceed to Step S23 (YES in Step S22) so as to perform refresh charging by using an integrated value of charging/discharging quantity of electricity during a deficient charging period as a refresh start requirement, in other words, so as to perform refresh charging each time the integrated value is incremented by a predetermined quantity of electricity.

On the other hand, in the case where a predetermined refresh start requirement is not satisfied e.g. in the case where an operation command to perform refresh charging from the user is not accepted by e.g. the switch 7, the refresh charging controller 33 proceeds to Step S28 without performing refresh charging (NO in Step S22).

In Step S23, the refresh charging controller 33 turns the LED 8 on (Step S23). Then, the refresh charging controller 33 alerts the user that refresh charging is being performed.

If the user stops charging during refresh charging, it is impossible to sufficiently refresh the lead storage battery 1. In view of this, the refresh charging controller 33 turns the LED 8 on to alert the user that refresh charging is being performed, whereby the user is alerted not to stop the charging.

Next, the refresh charging quantity setter 31 acquires a refresh charging quantity of electricity Qr which is stored in the lookup table in correlation with the deficient charging period $t_A$ and the average temperature Tave (Step S24).

In this embodiment, the refresh charging quantity of electricity Qr is acquired by using the lookup table in Steps S1, S2, S24. Alternatively, the refresh charging quantity of electricity Qr may be calculated by using the equation (1).

Next, the refresh charging controller 33 charges the lead storage battery 1 with the refresh charging quantity of electricity Qr to eliminate crystallization of lead sulfate and to refresh the lead storage battery 1 (Step S25). Specifically, the refresh charging controller 33 charges the lead storage battery 1 with the refresh charging quantity of electricity Qr by continuing refresh charging for a refresh charging time tref (tref=Qr/Icn), which is required for charging the lead storage battery 1 with the refresh charging quantity of electricity Qr at a current value Icn (0.025 C) set as the set current value Is.

Alternatively, the refresh charging time tref may be stored in the lookup table, in place of the refresh charging quantity of electricity Qr, to directly obtain the refresh charging time tref from the lookup table.

The inventors found that the content rate of lead sulfate relative to the positive electrode active material of the lead storage battery 1 is set in the range of from 3% by mass to 11% by mass, and that the content rate of lead sulfate relative to the negative electrode active material is set in the range of from 2% by mass to 6% by mass by performing refresh charging in Step S25.

Next, the refresh charging controller 33 sets the output current of the charging circuit 4 to zero so as to terminate refresh charging (Step S26 or the timing E), and the LED 8 is turned off (Step S27). In FIG. 8, the refresh charging is indicated by the region γ.

Next, in Step S28, the deficient charging period $t_A$ and the average temperature Tave are initialized, and the routine proceeds to Step S1 again.

Referring to FIG. 8, the lead storage battery 1 constructed by series-connecting six cells each of which has a nominal voltage of 2V is charged to 14.4V with 0.2 C for the first time (first-stage charging), is charged to 14.4V with 0.1 C (second-stage charging), is charged to 14.4V with 0.05 C (third-stage charging), and is charged to 14.4V with 0.025 C (fourth-stage charging). The region α where charging is performed with 14.4V or lower is a region where the charging efficiency is relatively good. However, it is impossible to supply a total charging quantity of electricity substantially equivalent to a total discharging quantity of electricity, as far as the charging and discharging as described above are repeated. Consequently, the lead storage battery 1 is not fully charged (deficient charging region).

Out of the charging regions where charging is performed over 14.4V, the region β is a region where a deficient quantity of electricity (a difference between the total discharging quantity of electricity and the total charging quantity of electricity) is charged. In other words, the lead storage battery 1 is fully charged at a last timing D of the region β.

The region γ is a region where further charging is performed from a fully charged state. The main reaction in the regions β and γ is decomposition reaction of an electrolyte. Accordingly, the charging efficiency is very small. However, continuing charging until the region γ securely recovers the crystallized lead sulfate to an active material. Thus, it is possible to approximate the SOC with respect to the initial full charging capacity before the lead storage battery 1 is degraded to 100%. The charging in the region γ, in addition to the charging in the regions α and β, is called as refresh charging.

The region β greatly changes depending on an environment temperature at which deficient charging is performed. Specifically, charging efficiency is improved in a high-temperature condition, because the higher the temperature is, the smaller the internal resistance is, and charging reaction easily occurs. Accordingly, the charging quantity of electricity in the region α is large relative to the charging quantity of electricity in the region β.

The control unit 3 may have the following four functions, for instance. The first function is a function of storing a charging pattern in the deficient charging region shown in FIG. 8, and of issuing a command to the charging unit 1. The second function is a function of storing an arithmetic expression (e.g. the aforementioned equation: $Qr=Q_1t_1+Q_2t_2+\ldots+Q_nt_n$) on an idealistic refresh charging quantity of electricity Qr, which reflects an empirical result of repeating deficient charging and discharging for a certain time in a certain temperature condition. The third function is a function of applying a battery jar temperature sent from the temperature measuring unit 2 and a time measured by a timer (not shown) to the arithmetic expression stored by the second function. For instance, the third function calculates a term of $Q_1t_1$, based on a coefficient $Q_1$ derived from a battery jar temperature $T_1$, and based on a sum of time $t_1$ where the battery jar temperature is $T_1$. The fourth function is a function of storing a frequency with which refresh charging should be performed, and of controlling the charging circuit 4, upon reaching the above frequency, to forcibly perform refresh charging (in the region γ), following the deficient charging (in the region α) and via the region β until the charging quantity of electricity calculated by the third function is reached.

Alternatively, the battery jar temperature T may have a certain range. For example, a battery jar temperature $T_A$: $20 \leq T_A < 25$ (unit: °C.) may read as "$T_A=22.5$" in all the cases, and a term of $Q_A t_A$ may be calculated based on a coefficient $Q_A$ derived from $T_A=22.5$, and based on a sum of time $t_A$ when $T_A$ is $20 \leq T_A < 25$ to obtain an idealistic refresh charging quantity of electricity Qr which satisfies the aforementioned arithmetic expression.

Figure 9:
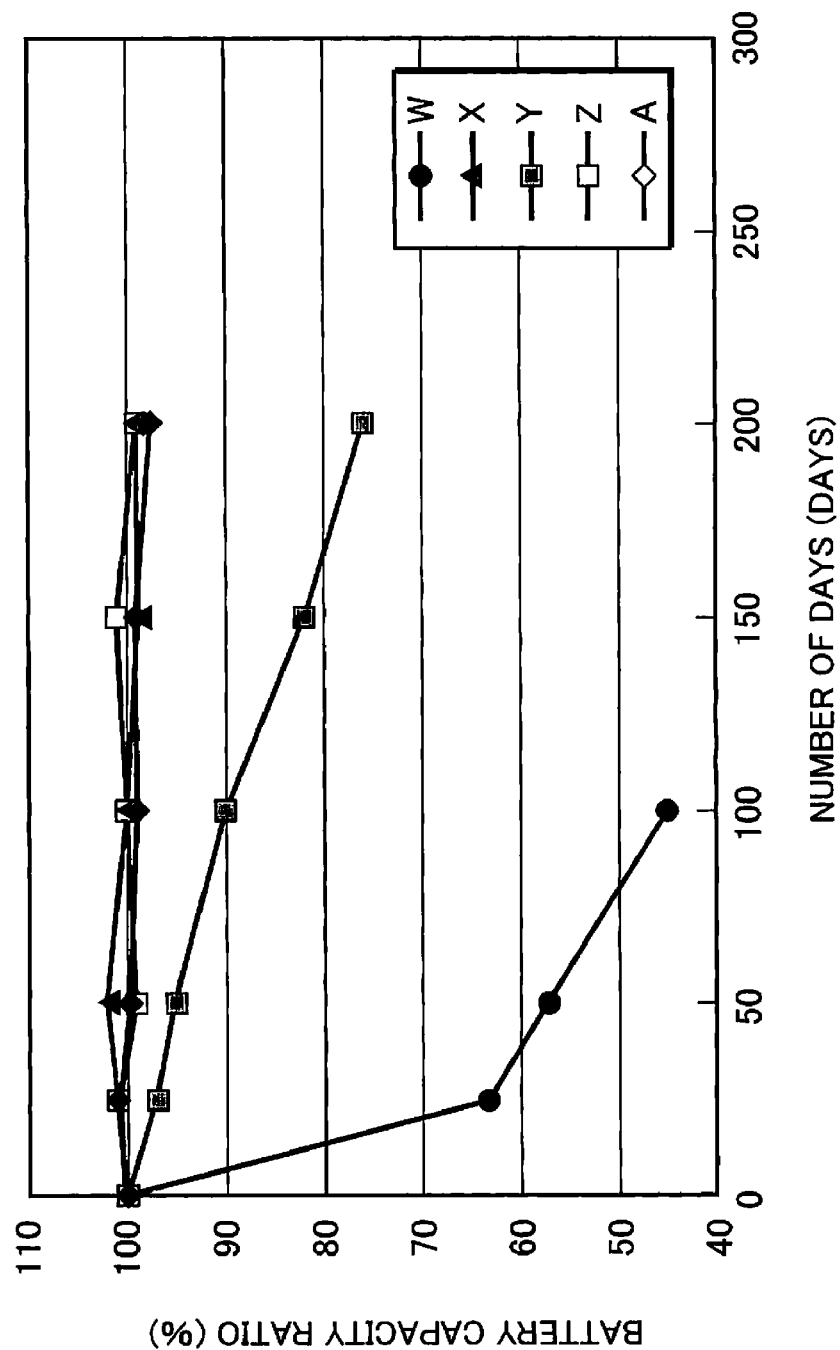
FIG. 9 is an explanatory diagram for describing an advantage of the charging control method according to an aspect of the invention.

FIG. 9 is an explanatory diagram for describing an advantage of a charging control method according to an aspect of the invention. Discharging and deficient charging were repeated by using, as the lead storage battery 1, a control valve type lead storage battery whose nominal capacity was 60 Ah and whose nominal voltage was 12V at predetermined temperatures as described below. Discharging and deficient charging were repeated by discharging at a constant current of 20 A until 11.5V, followed by deficient charging with a charging pattern shown in the region α in FIG. 8, and by changing the SOC in the range of about 30% to about 70%.

The following battery life characteristics W, X, Y, Z, A as represented by graphs were compared with each other by setting the horizontal axis representing the number of days when the aforementioned discharging and deficient charging were continuously repeated, and by setting the vertical axis representing the battery capacity ratio (%), which is a ratio of the full charging capacity of the lead storage battery 1 relative to the initial capacity at the lapse of the corresponding number of days, in the case where the initial capacity was set to 100%.

The graph indicated by W shows a result, wherein only deficient charging and discharging were repeated at 25° C., and refresh charging was not performed.

The graph indicated by X shows a result, wherein after deficient charging and discharging were repeated at 25° C., the battery was placed in a temperature environment of 25° C. once per seven days, and overcharging corresponding to 15% of nominal capacity was performed as refresh charging. The condition of the graph X shows an idealistic refresh charging condition in a temperature environment of 25° C.

The graph indicated by Y shows a result, wherein after deficient charging and discharging were repeated at 45° C., the battery was placed in a temperature environment of 25° C. once per seven days, and overcharging corresponding to 15% of nominal capacity was performed as refresh charging in the same manner as the graph X.

The graph indicated by Z shows a result, wherein after deficient charging and discharging were repeated at 45° C., the battery was placed in a temperature environment of 25° C. once per seven days, an idealistic refresh charging quantity of electricity Qr was calculated based on a coefficient $Q_{45}$ corresponding to 45° C., and a sum of time $t_{45}$ when the lead storage battery 1 was placed in a temperature condition of 45° C. by using the equation (1), and refresh charging was performed until the charging quantity of electricity Qr in refresh charging was reached.

The graph indicated by A shows a result, wherein deficient charging at 45° C. and deficient charging at 25° C. were alternately performed each for seven days, a refresh charging quantity of electricity Qr was calculated based on the temperatures at which the battery was placed once per seven days during each deficient charging by using the equation (1), and refresh charging was performed until the charging quantity of electricity Qr in refresh charging was reached.

In other words, the graph X shows a result, wherein deficient charging and discharging were repeated in a temperature condition of 25° C. without a temperature change to generate sulfation, and an idealistic refresh charging suitable for the temperature condition of 25° C. was periodically performed. The graph Y shows a result, wherein deficient charging and discharging were repeated in a temperature condition of 45° C. without a temperature change to generate sulfation, and an idealistic refresh charging suitable for the temperature condition of 25° C. was periodically performed.

The graph Z shows a result, wherein deficient charging and discharging were repeated in a temperature condition of 45° C. without a temperature change to generate sulfation, and refresh charging was periodically performed by the charging control method according to an aspect of the invention.

The graph A shows a result, wherein deficient charging and discharging were repeated in a temperature condition where the temperature was repeatedly shifted between 25° C. and 45° C. to generate sulfation, and refresh charging was periodically performed by the charging control method according to an aspect of the invention.

In other words, the graph W is a graph showing characteristic degradation of the lead storage battery 1, in the case where refresh charging was not performed, and the graph X shows an effect by idealistic refresh charging. The graph Y is a comparative example showing that sufficient refreshing effect is not obtained in the case where a temperature environment of repeating deficient charging and discharging reaches 45° C., even if refresh charging is performed with a refresh charging quantity of electricity optimized at 25° C.

The graph Z corresponds to an example of the invention, taking into account a temperature history during a period when deficient charging and discharging are repeated, in a condition that the temperature environment is fixed to 45° C. The graph A corresponds to an example to which the present invention is applied in a condition where the temperature environment is not fixed, in other words, is changed.

In the case where deficient charging and discharging are repeated in a temperature environment of 25° C. where charging efficiency is relatively high but lead sulfate is less likely to crystallize, as shown by the graph X, performing refresh charging by overcharging corresponding to 15% of nominal capacity significantly improves battery life characteristics, with a slight decrease in the battery capacity ratio, in comparison with the graph W in which refresh charging is not performed.

However, in the case where deficient charging and discharging are repeated in a temperature environment of 45° C. where charging efficiency is high and lead sulfate is likely to crystallize, as shown by the graph Y, battery life characteristic is not sufficiently improved, even if refresh charging is performed with overcharging corresponding to 15% of nominal capacity, which provides an effect in the case where deficient charging and discharging are repeated in a temperature condition of 25° C. In other words, it is difficult or impossible to sufficiently recover lead sulfate which has been crystallized in a temperature environment of 45° C. as an active material, with the same refresh charging quantity of electricity as in the temperature condition of 25° C.

In contrast, the graph Z showing a result, wherein after deficient charging was repeated at 45° C., the refresh charging quantity of electricity Qr was calculated by the equation (1) of the present invention, and refresh charging was performed until the charging quantity of electricity Qr in refresh charging was reached, showed satisfactory battery life characteristics similar to those in the graph X satisfying an idealistic condition where lead sulfate is less likely to crystallize.

Specifically, it is confirmed that the graph Z shows that substantially the same refreshing effect as obtained in an idealistic refresh condition is obtained by the charging control method according to an aspect of the invention, and the charging control circuit 11, even in a high-temperature condition where lead sulfate is likely to crystallize.

Further, the graph A shows satisfactory battery life characteristics similar to those in the graph X satisfying an idealistic condition. Thus, it is confirmed that the graph A shows that substantially the same refreshing effect as obtained in an idealistic refresh condition is obtained by the charging control method according to an aspect of the invention, and the charging control circuit 11, even in a condition where discharging and deficient charging are repeated in a temperature environment where the temperature is changed.

In view of the above results, it is clear that the life of the lead storage battery 1 can be extended by utilizing the functions of the control unit 3 after obtaining in advance a temperature history in the case where deficient charging and discharging are repeated, as a battery jar temperature of the lead storage battery 1, and by performing charging control of changing the charging quantity of electricity in refresh charging in accordance with the temperature history based on the premise that the lead storage battery 1 has undergone various temperatures.

As described above, it is possible to obtain substantially the same effect as the case of using the equation (1) by acquiring a refresh charging quantity of electricity Qr using the lookup table as shown in FIG. 5, in place of calculating a refresh charging quantity of electricity Qr by using the equation (1).

Further, as described above, in the case where multi-stage constant current charging is performed to fully charge the lead storage battery, an increase in the charging quantity of electricity (an increase in the charging time) by the first-time constant current charging increases the refresh charging quantity of electricity Qr, and an increase in the estimated deposited amount of lead sulfate increases the refresh charging quantity of electricity Qr, whereby the effect of eliminating lead sulfate can be increased. Thus, the effect of eliminating sulfation, in other words, the refreshing effect is enhanced.

Next, the following is an explanation about a significance of setting the content rate of lead sulfate relative to the positive electrode active material in the range of from 3% by mass to 11% by mass, and setting the content rate of lead sulfate relative to the negative electrode active material in the range of from 2% by mass to 6% by mass.

The inventors have empirically found that by performing refresh charging of the lead storage battery 1 by the charging control method using the charging control circuit 11, the content rate of lead sulfate relative to the positive electrode active material is set in the range of from 3% by mass to 11% by mass, and the content rate of lead sulfate relative to the negative electrode active material is set in the range of from 2% by mass to 6% by mass upon completion of the refresh charging, in other words, after Step S26 in FIG. 7 or at the timing E in FIG. 8.

FIG. 10 is a table showing a measurement result on the content rate of lead sulfate relative to each of the positive electrode active material and the negative electrode active material, in the case where overcharging is performed at the timings A, B, D, E shown in FIG. 8, and thereafter.

Comparative example 1 shows the content rates of lead sulfate after discharging of the lead storage battery 1 (at the timing A). Comparative example 2 shows the content rates of lead sulfate during charging of the lead storage battery 1 (at the timing B). Comparative examples 3, 4 show the content rates of lead sulfate after full charging of the lead storage battery 1 (at the timing D). Comparative examples 5, 6 show the content rates of lead sulfate after overcharging of the lead storage battery 1.

In comparative examples 1 to 4, the content rate of lead sulfate relative to the positive electrode active material was in the range of from 33.0 to 11.5% by mass, and the content rate of lead sulfate relative to the negative electrode active material was in the range of from 29.0 to 1.7% by mass. Further, in comparative examples 5, 6, the content rate of lead sulfate relative to the positive electrode active material was in the range of from 2.5 to 2.7% by mass, and the content rate of lead sulfate relative to the negative electrode active material was in the range of from 7.5 to 6.8% by mass.

In contrast, inventive examples 1, 2, 3 show the content rates of lead sulfate after refresh charging (at the timing E) by the charging control method according to an aspect of the invention. In inventive examples 1, 2, 3, the content rate of lead sulfate relative to the positive electrode active material was in the range of from 11.0 to 3.0% by mass, and the content rate of lead sulfate relative to the negative electrode active material was in the range of from 2.0 to 6.0% by mass.

There was confirmed a phenomenon that repeating deficient charging and discharging using the lead storage batteries 1 of comparative examples 3, 4 resulted in deposition of lead sulfate on the positive electrode, and lowering of charging/discharging reaction. Further, there was confirmed a phenomenon that repeating deficient charging and discharging using the lead storage batteries 1 of comparative examples 5, 6 resulted in deposition of lead sulfate on the negative electrode, and lowering of charging/discharging reaction. The condition in which deficient charging and discharging are repeated is the same among all the comparative examples and all the inventive examples.

In contrast, in the case where deficient charging and discharging are repeated using the lead storage batteries of inventive examples 1, 2, 3, the deposited amounts of lead sulfate on the positive electrode and on the negative electrode were smaller than those in comparative examples 3 to 6. In particular, the deposited amount of lead sulfate was significantly small in inventive example 2.

The following is an explanation about a reason why the lead storage battery satisfying a requirement that the content rate of lead sulfate relative to the positive electrode active material is set in the range of from 3% by mass to 11% by mass, and the content rate of lead sulfate relative to the negative electrode active material is set in the range of from 2% by mass to 6% by mass, is advantageous in suppressing generation of sulfation resulting from repeating deficient charging and discharging, in comparison with a lead storage battery 1 whose content rate of lead sulfate relative to the active material is out of the aforementioned range of content rate.

The chemical reaction formula of a lead storage battery is expressed by the following equations (2) to (4).

Whole reaction:

$$\text{charging } PbO_2 + Pb + 2H_2SO_4 \longleftrightarrow \text{discharging } 2PbSO_4 + 2H_2O \tag{2}$$

Positive electrode:

$$\text{charging } PbO_2 + 4H^+ + SO_4^{2-} + 2e^- \longleftrightarrow \text{discharging } PbSO_4 + 2H_2O \tag{3}$$

Negative electrode:

$$\text{charging } Pb + SO_4^{2-} \longleftrightarrow \text{discharging } PbSO_4 + 2e^- \tag{4}$$

Here, a lead storage battery generates oxygen gas and hydrogen gas by electrolysis of water during charging. If oxygen gas is generated, reaction of transforming a product (Pb) obtained by charging on the negative electrode into lead sulfate ($Pb + 0.5O^2 \rightarrow PbO$, $PbO + H_2SO_4 \rightarrow PbSO_4 + H_2O$) occurs by the oxygen gas, thereby increasing $PbSO_4$ on the negative electrode.

On the other hand, $PbSO_4$ on the negative electrode is decreased resulting from charging reaction ($PbSO_4 + 2e^- \rightarrow Pb + SO_4^{2-}$). Accordingly, it is possible to suppress an excessive increase in $PbSO_4$ on the negative electrode, and to reduce sulfation by balancing between generation reaction of $PbSO_4$ on the negative electrode by oxygen gas, and decomposition reaction of $PbSO_4$ by charging reaction.

Here, since $PbSO_4$ has a property that it inhibits reaction between Pb and oxygen, the existence of $PbSO_4$ suppresses reaction of transforming the aforementioned product (Pb) obtained by charging on the negative electrode into lead sulfate, and yields decomposition reaction of $PbSO_4$ by charging reaction. If, on the other hand, there is no $PbSO_4$, decomposition reaction of $PbSO_4$ by charging reaction does not occur, and reaction of generating $PbSO_4$ on the negative electrode by oxygen gas excessively occurs, because reaction between Pb and oxygen is not inhibited, thereby excessively generating $PbSO_4$.

In view of the above, a certain amount of $PbSO_4$ on the negative electrode is required to balance between reaction of generating $PbSO_4$ on the negative electrode by oxygen gas, and decomposition reaction of $PbSO_4$ by charging reaction. Here, if the content rate of lead sulfate ($PbSO_4$) on the negative electrode is 1.7% by mass, as shown in comparative example 4, shortage of $PbSO_4$ may collapse the balance, and sulfation may be generated resulting from excessive generation of $PbSO_4$.

On the other hand, in inventive example 1, in the case where the content rate of lead sulfate ($PbSO_4$) on the negative electrode is 2.0% by mass, balance between generation and decomposition of $PbSO_4$ is secured, and generation of sulfation is suppressed. Accordingly, it is essentially significant to satisfy the requirement that the content rate of lead sulfate ($PbSO_4$) relative to the negative electrode active material is set to 2.0% by mass or more.

On the other hand, if a certain amount of lead sulfate ($PbSO_4$) exists on the negative electrode, charging reaction ($PbSO_4+2H_2O \rightarrow PbO_2+4H^++SO_4^{2-}+2e^-$) occurs. Here, in the case where the content rate of lead sulfate ($PbSO_4$) relative to the positive electrode is 2.5% by mass, as shown in comparative example 5, shortage of lead sulfate ($PbSO_4$) is less likely to cause the aforementioned charging reaction, and the charged quantity of electricity is consumed by electrolysis of water ($H_2O \rightarrow 2H+0.5O_2+2e^-$), and oxygen gas is generated. Conceivably, if oxygen gas is generated, the aforementioned reaction of generating $PbSO_4$ on the negative electrode by oxygen gas is accelerated, which may collapse the aforementioned balance, and excessive generation of $PbSO_4$ on the negative electrode may generate sulfation.

On the other hand, as shown in inventive example 3, conceivably, if the content rate of lead sulfate ($PbSO_4$) relative to the positive electrode material is set to 3.0% by mass, balances between generation and decomposition of $PbSO_4$ is secured, and generation of sulfation is suppressed. Accordingly, it is critically significant to satisfy the requirement that the content rate of lead sulfate ($PbSO_4$) relative to the positive electrode active material is set to 3.0% by mass or more.

As described above, a lead storage battery satisfying a requirement that the content rate of lead sulfate relative to the positive electrode active material is set in the range of from 3% by mass to 11% by mass, and the content rate of lead sulfate relative to the negative electrode active material is set in the range of from 2% by mass to 6% by mass, is advantageous in suppressing generation of sulfation resulting from repeating deficient charging and discharging, in comparison with a lead storage battery whose content rate of lead sulfate relative to the active material is out of the aforementioned range of content rate.

Further, the inventors have empirically found that the lead storage batteries 1 of inventive examples 1, 2, 3 obtained by refresh charging (at the timing E) by the charging control method according to an aspect of the invention, has the content rate of lead sulfate relative to the positive electrode active material to be held on an upper portion of the positive electrode plate B3 of three times or more of the content rate of lead sulfate relative to the positive electrode active material to be held on a lower portion of the positive electrode plate B3; and has the content rate of lead sulfate relative to the negative electrode active material to be held on an upper portion of the negative electrode plate B4 of three times or more of the content rate of lead sulfate relative to the negative electrode active material to be held on a lower portion of the negative electrode plate B4.

FIG. 11 is an explanatory diagram for describing, in detail, a distribution of lead sulfate on the positive electrode plate B3 and on the negative electrode plate B4. More precisely, as shown in FIG. 11, the upper portion and the lower portion of each of the positive electrode plate B3 and the negative electrode plate B4 correspond to an upper portion and a lower portion, out of an upper portion, a middle portion, and a lower portion obtained by equally dividing a portion having the length L of each of the positive electrode plate B3 and the negative electrode plate B4 in vertical direction, which is covered by an active material B35, into three parts in vertical direction. The description on the case where the portion having the length L of each of the positive electrode plate B3 and the negative electrode plate B4 in vertical direction is equally divided into three parts i.e. an upper portion, a middle portion, and a lower portion in vertical direction in this order, is substantially the same as the description about the aforementioned case.

As described above, out of an upper portion of an electrode plate near the collecting tab B34 and a lower portion thereof away from the collecting tab B34, the content rate of lead sulfate relative to the active material is increased as the part of the electrode plate is lowered. An increase in the difference between the content rate Mup of the upper portion and the content rate Munder of the lower portion shortens the battery life of the lead storage battery 1.

However, the inventors found that in the case where the relation between the content rate Mup of the upper portion and the content rate Munder of the lower portion satisfies Mup×3≧Munder on the positive electrode, and satisfies Mup×9≧Munder on the negative electrode, there is no or less likelihood that the battery life may be shortened resulting from variation in the content rate of lead sulfate between the electrode upper portion and the electrode lower portion.

To sum up, if deficient charging of the lead storage battery 1 is repeated, reaction easily occurs on an electrode plate upper portion close to the collecting tab B34 than on an electrode plate lower portion away from the collecting tab B34, and variation in the lead sulfate content rate between the upper portion and the lower portion is increased. An increase in the variation of the content rate of lead sulfate relative to an active material shortens the battery life. However, since conductivity of the negative electrode active material (Pb) is higher than that of the positive electrode active material ($PbO_2$), the negative electrode is less likely to be affected by the variation in the lead sulfate content rate than the positive electrode. In view of this, even if a variation in the lead sulfate content rate is increased between the upper portion and the lower portion of the negative electrode than that between the upper portion and the lower portion of the positive electrode, shortening of the battery life resulting from a variation in the lead sulfate content rate is suppressed in an allowable range.

A charging control circuit according to an aspect of the invention is provided with a temperature measuring unit which measures a temperature of a lead storage battery; a charging unit which charges the lead storage battery; a full charging controller which controls the charging unit to charge the lead storage battery until the lead storage battery is fully charged; a refresh charging controller which controls the charging unit to perform refresh charging of charging the lead storage battery with a predetermined refresh charging quantity of electricity, after the lead storage battery has been fully charged; and a refresh charging quantity setter which sets the refresh charging quantity of electricity in the refresh charging of the lead storage battery which has been fully charged at a present time, depending on the temperature of the lead storage battery measured by the temperature measuring unit throughout a deficient charging period, the deficient charging period being a period from a time when the lead storage battery has been fully charged at a previous time to a time when the lead storage battery has been fully charged at the present time by the full charging controller.

A charging control method according to another aspect of the invention includes a full charging step of charging a lead storage battery until the lead storage battery is fully charged;

a refresh charging step of performing refresh charging of charging the lead storage battery with a predetermined refresh charging quantity of electricity, after the lead storage battery has been fully charged; and a refresh charging quantity setting step of setting the refresh charging quantity of electricity in the refresh charging step for the lead storage battery which has been fully charged at a present time, depending on a temperature of the lead storage battery throughout a deficient charging period, the deficient charging period being a period from a time when the lead storage battery has been fully charged at a previous time to a time when the lead storage battery has been fully charged at the present time in the full charging step.

It is conceived that crystallization of lead sulfate deposits without elimination during a deficient charging period from a time when a lead storage battery has been fully charged at a previous time to a time when the lead storage battery has been fully charged at a present time. The inventors found that during a deficient charging period when charging/discharging is repeated without achieving a fully charged state, the degree of sulfation resulting from crystallization of lead sulfate differs depending on a temperature of the lead storage battery.

According to the above arrangement and method, the temperature of the lead storage battery is continued to be measured throughout the entirety of the deficient charging period. Further, the refresh charging quantity of electricity is set by the refresh charging quantity setter depending on the thus-obtained temperatures of the lead storage battery throughout the entirety of the deficient charging period. Accordingly, the refresh charging quantity of electricity reflects the degree of sulfation of the lead storage battery which has been generated throughout the entirety of the deficient charging period. Since refresh charging is performed by charging the lead storage battery which has been fully charged at the present time with a refresh charging quantity of electricity reflecting the degree of sulfation which is estimated to have been generated up to the present time, it is possible to enhance the effect of eliminating sulfation resulting from repeating deficient charging of the lead storage battery.

Preferably, the refresh charging quantity setter may increase the refresh charging quantity of electricity, as the temperature of the lead storage battery measured by the temperature measuring unit is increased throughout the deficient charging period.

The inventors found that during a deficient charging period when charging/discharging is repeated without achieving a fully charged state, as the temperature of a lead storage battery is increased, sulfation resulting from crystallization of lead sulfate is likely to progress. According to the above arrangement, as the temperature of the lead storage battery is increased throughout the deficient charging period, in other words, as sulfation progresses, the refresh charging quantity of electricity is increased, and the refreshing effect of eliminating crystallization of lead sulfate is increased. This enables to enhance the effect of eliminating sulfation resulting from repeating deficient charging of the lead storage battery.

Preferably, the refresh charging controller may set the content rate of lead sulfate relative to a positive electrode active material of the lead storage battery in the range of from 3% by mass to 11% by mass, and may set the content rate of lead sulfate relative to a negative electrode active material of the lead storage battery in the range of from 2% by mass to 6% by mass by performing the refresh charging.

The inventors found that the lead storage battery which has undergone the refresh charging has a content rate of lead sulfate relative to the positive electrode active material in the range of from 3% by mass to 11% by mass, and has a content rate of lead sulfate relative to the negative electrode active material in the range of from 2% by mass to 6% by mass. Further, the inventors found that the lead storage battery whose content rate of lead sulfate lies in the aforementioned range has a reduced amount of lead sulfate resulting from repeating deficient charging, and is less likely to generate sulfation, in comparison with a lead storage battery whose content rate is out of the aforementioned range.

Preferably, the charging control circuit may be further provided with a storage which stores in advance a temperature coefficient as a coefficient correlated with a temperature of the lead storage battery, in correlation with the temperature of the lead storage battery, wherein the refresh charging quantity setter calculates the refresh charging quantity of electricity by summing up a product obtained by multiplying a time when the temperature of the lead storage battery is equal to the temperature correlated with the temperature coefficient, with the correlated temperature coefficient throughout the entirety of the deficient charging period, based on the temperature coefficient stored in the storage and based on the temperature measured by the temperature measuring unit.

With the above arrangement, the refresh charging quantity of electricity is calculated by summing up a product obtained by multiplying a time when the temperature of the lead storage battery is equal to a temperature correlated with a temperature coefficient, with the correlated temperature coefficient throughout the entirety of the deficient charging period, based on the temperature coefficient and based on the temperature measured by the temperature measuring unit. In this arrangement, the product obtained by multiplying the time with the temperature coefficient corresponds to the quantity of electricity that reflects the degree of sulfation which is estimated to be generated based on the temperature and based on the time when the temperature of the lead storage battery is equal to the temperature correlated with the temperature coefficient. Since the refresh charging quantity of electricity is calculated by summing up the thus-obtained quantity of electricity (product) throughout the entirety of the deficient charging period, the degree of sulfation which has been generated throughout the entirety of the deficient charging period is reflected on the refresh charging quantity of electricity with precision, whereby the precision of eliminating sulfation can be improved.

Preferably, the refresh charging quantity setter may calculate the refresh charging quantity of electricity Qr using the following equation (1), assuming that $t_A$ is a duration of the deficient charging period, $t_1$ is a time when the temperature of the lead storage battery is equal to $T_1$, $t_2$ is a time when the temperature of the lead storage battery is equal to $T_2$, $t_n$ (where n is a positive integer) is a time when the temperature of the lead storage battery is equal to $T_n$, $Q_1, Q_2, \ldots, Q_n$ are temperature coefficients correlated with the temperatures $T_1, T_2, \ldots, T_n$, and $t_A = t_1 + t_2 + \ldots + t_n$.

$$Qr = Q_1 t_1 + Q_2 t_2 + \ldots + Q_n t_n \tag{1}$$

With the above arrangement, the refresh charging quantity setter is operable to calculate the refresh charging quantity of electricity Qr by summing up a product $(Q_1 t_1, Q_2 t_2, \ldots, Q_n t_n)$ obtained by multiplying the time $t_1, t_2, \ldots, t_n$ when the temperature of the lead storage battery is equal to a temperature correlated with a temperature coefficient, with the correlated temperature coefficient, based on the temperature coefficients $Q_1, Q_2, \ldots, Q_n$ stored in the storage and based on the temperatures $T_1, T_2, \ldots, T_n$ measured by the temperature measuring unit throughout the entirety of the deficient charging period.

Preferably, the temperature coefficient may be a value, at a corresponding temperature, representing a charging quantity of electricity capable of substantially eliminating sulfation per unit time resulting from charging/discharging in a state that the lead storage battery is not fully charged.

With the above arrangement, the charging quantity of electricity capable of substantially eliminating sulfation which is estimated to be generated throughout the entirety of the deficient charging period is calculated as the refresh charging quantity of electricity.

Preferably, the charging control circuit may be further provided with a storage which stores in advance the refresh charging quantity of electricity in correlation with the temperature of the lead storage battery during the deficient charging period and with a duration of the deficient charging period, wherein the refresh charging quantity setter sets the refresh charging quantity of electricity by acquiring, from the storage, a refresh charging quantity of electricity stored in correlation with the temperature measured by the temperature measuring unit and with the duration of the deficient charging period.

With the above arrangement, since the refresh charging quantity setter is operable to set the refresh charging quantity of electricity by acquiring, from the storage, the refresh charging quantity of electricity which is stored in correlation with the temperature measured by the temperature measuring unit and with the duration of the deficient charging period, it is possible to simplify the process of setting the refresh charging quantity of electricity.

Preferably, the refresh charging quantity setter may set an average value of the temperatures of the lead storage battery during the deficient charging period, as a temperature of the lead storage battery in setting the refresh charging quantity of electricity.

Even if the temperature of lead storage battery varies during a deficient charging period, the degree of sulfation generated during the deficient charging period can be approximated to a degree of sulfation which is estimated to be generated in the case where the temperature of the lead storage battery during the deficient charging period is fixed to an average temperature during the deficient charging period. With this arrangement, it is possible to simplify the process of setting the refresh charging quantity of electricity by using the average value of temperatures of the lead storage battery during the deficient charging period as the temperature of the lead storage battery in setting the refresh charging quantity of electricity by the refresh charging quantity setter.

Preferably, the full charging controller may control the charging unit to charge the lead storage battery by multi-stage constant current charging of repeating, a predetermined number of times, constant current charging of supplying a current of a set current value until a terminal voltage of the lead storage battery reaches a predetermined threshold voltage, and of reducing the set current value each time the constant current charging is performed.

With the above arrangement, since the full charging controller charges the lead storage battery by a multi-stage constant current charging system, it is easy to shorten a time required for fully charging the lead storage battery.

Preferably, the full charging controller may control the charging unit to fully charge the lead storage battery by supplying a predetermined complementary charging quantity of electricity to the lead storage battery, after the constant current charging is performed the predetermined number of times.

With the above arrangement, after constant current charging of supplying a current of a set current value until the terminal voltage of the lead storage battery reaches a threshold voltage is repeated a predetermined number of times, charging with a complementary charging quantity of electricity is performed. This increases reliability of fully charging the lead storage battery.

Preferably, the refresh charging quantity setter may increase the refresh charging quantity of electricity, as the charging quantity of electricity at a first-time constant current charging out of the predetermined number of times of constant current charging is increased.

The first-time constant current charging in the aforementioned multi-stage constant current charging is performed until the terminal voltage V of the lead storage battery reaches a threshold voltage, after charging is started. With this arrangement, as the SOC of the lead storage battery before charging is started is decreased, the charging quantity of electricity required to raise the terminal voltage to the threshold voltage is increased. An increase in the charging quantity of electricity at the first-time constant current charging means a decrease in the SOC of the lead storage battery before charging is started. A lead storage battery has a property that lead sulfate is likely to deposit, as the lead storage battery is discharged until the SOC is lowered. An increase in the charging quantity of electricity at the first-time constant current charging means that the lead storage battery is brought to a condition where lead sulfate is likely to deposit before charging is started. In view of the above, an increase in the charging quantity of electricity at the first-time constant current charging increases the refresh charging quantity of electricity, and an increase in the estimated deposited amount of lead sulfate increases the refresh charging quantity of electricity, whereby the effect of eliminating lead sulfate is increased. Thus, it is possible to increase the effect of eliminating sulfation.

A power source device according to another aspect of the invention is provided with the aforementioned charging control circuit, and the lead storage battery.

The power source device having the above arrangement is advantageous in enhancing the effect of eliminating sulfation resulting from repeating deficient charging of the lead storage battery, as well as the aforementioned charging control circuit.

A lead storage battery according to yet another aspect of the invention is provided with a positive electrode plate which holds a positive electrode active material; and a negative electrode plate which holds a negative electrode active material, wherein the content rate of lead sulfate relative to the positive electrode active material is set in the range of from 3% by mass to 11% by mass, and the content rate of lead sulfate relative to the negative electrode active material is set in the range of from 2% by mass to 6% by mass by the refresh charging by the aforementioned charging control method.

A lead storage battery according to still another aspect of the invention is provided with a positive electrode plate which holds a positive electrode active material; and a negative electrode plate which holds a negative electrode active material, wherein the content rate of lead sulfate relative to the positive electrode active material is set in the range of from 3% by mass to 11% by mass, and the content rate of lead sulfate relative to the negative electrode active material is set in the range of from 2% by mass to 6% by mass.

The inventors found that a lead storage battery whose content rate of lead sulfate lies in the aforementioned numerical value range has a reduced amount of lead sulfate resulting from repeating deficient charging, and is less likely to generate sulfation in comparison with a lead storage battery whose content rate of lead sulfate is out of the aforementioned numerical value range.

Preferably, the positive electrode plate and the negative electrode plate may extend along a vertical direction, an upper end of each of the positive electrode plate and the negative electrode plate may be formed into a collecting portion, each of the positive electrode plate and the negative electrode plate may be equally divided into three portions in a vertical direction, the three portions being an upper portion, a middle portion, and a lower portion in this order from an upper side, the content rate of lead sulfate relative to a positive electrode active material to be held on the lower portion of the positive electrode plate may be three times or less of the content rate of lead sulfate relative to a positive electrode active material to be held on the upper portion of the positive electrode plate, and the content rate of lead sulfate relative to a negative electrode active material to be held on the lower portion of the negative electrode plate may be nine times or less of the content rate of lead sulfate relative to a negative electrode active material to be held on the upper portion of the negative electrode plate.

The inventors found that as far as the content rate of lead sulfate relative to a positive electrode active material to be held on the lower portion of the positive electrode plate is three times or less of the content rate of lead sulfate relative to a positive electrode active material to be held on the upper portion of the positive electrode plate, and the content rate of lead sulfate relative to a negative electrode active material to be held on the lower portion of the negative electrode plate is nine times or less of the content rate of lead sulfate relative to a negative electrode active material to be held on the upper portion of the negative electrode plate, a variation in the content rate of lead sulfate between the upper portion and the lower portion of the electrode lies in an allowable range.

This application is based on Japanese Patent Application No. 2009-128465 filed on May 28, 2009, the contents of which are hereby incorporated by reference.

The embodiments or the examples described in the detailed description of the invention are provided to clarify the technical contents of the invention. The invention should not be construed to be limited to the embodiments or the examples. The invention may be modified in various ways as far as such modifications do not depart from the spirit and the scope of the invention hereinafter defined.

INDUSTRIAL APPLICABILITY

The present invention is not only applicable to a lead storage battery as a drive source for an electric vehicle, but also to a charging control method of a lead storage battery for various purposes of use; and a charging control circuit, a power source device, and a lead storage battery using the charging control method.

The invention claimed is:

1. A lead storage battery, comprising:
a positive electrode plate which holds a positive electrode active material; and
a negative electrode plate which holds a negative electrode active material, wherein the content rate of lead sulfate relative to the positive electrode active material is set in the range of from 3% by mass to 11% by mass, and the content rate of lead sulfate relative to the negative electrode active material is set in the range of from 2% by mass to 6% by mass,
the positive electrode plate and the negative electrode plate extend along a vertical direction,
an upper end of each of the positive electrode plate and the negative electrode plate is formed into a collecting portion,
each of the positive electrode plate and the negative electrode plate is equally divided into three portions in a vertical direction, the three portions being an upper portion, a middle portion, and a lower portion in this order from an upper side,
the content rate of lead sulfate relative to a positive electrode active material to be held on the lower portion of the positive electrode plate is three times or less of the content rate of lead sulfate relative to a positive electrode active material to be held on the upper portion of the positive electrode plate, and
the content rate of lead sulfate relative to a negative electrode active material to be held on the lower portion of the negative electrode plate is nine times or less of the content rate of lead sulfate relative to a negative electrode active material to be held on the upper portion of the negative electrode plate.

2. The lead storage battery according to claim 1, wherein the content rate of lead sulfate relative to the positive electrode active material is set in the range of from 3% by mass to 11% by mass, and the content rate of lead sulfate relative to the negative electrode active material is set in the range of from 2% by mass to 6% by mass by refresh charging by a charging control method including:
a full charging step of charging the lead storage battery until a fully charged state is reached;
a refresh charging step of performing refresh charging of charging the lead storage battery with a predetermined refresh charging quantity of electricity, after the lead storage battery has been fully charged; and
a refresh charging quantity setting step of setting the refresh charging quantity of electricity in the refresh charging of the lead storage battery which has been fully charged at a present time in such a manner that the refresh charging quantity of electricity is increased, as a temperature of the lead storage battery is increased throughout a deficient charging period depending on the temperature of the lead storage battery, the deficient charging period being a period from a time when the lead storage battery has been fully charged at a previous time until the lead storage battery has been fully charged at the present time in the full charging step.

* * * * *